US008706280B2

(12) United States Patent
Rouge et al.

(10) Patent No.: US 8,706,280 B2
(45) Date of Patent: Apr. 22, 2014

(54) DEVICE AND METHOD FOR FORMULATING A NUMERICAL MODEL OF A MANUFACTURED PRODUCT

(75) Inventors: Sylvie Rouge, Launaguet (FR); Davy Bogaert, Aurade (FR); Vincent Galvagnon, Villefranche de Lauragais (FR)

(73) Assignee: Cameleon Software, Labege (FR)

( * ) Notice: Subject to any disclaimer, the term of this patent is extended or adjusted under 35 U.S.C. 154(b) by 180 days.

(21) Appl. No.: 12/952,990

(22) Filed: Nov. 23, 2010

(65) Prior Publication Data

US 2011/0184545 A1      Jul. 28, 2011

(30) Foreign Application Priority Data

Nov. 23, 2009   (FR) ..................................... 09 05606

(51) Int. Cl.
*G06F 19/00*      (2011.01)

(52) U.S. Cl.
USPC ........................................................... 700/97

(58) Field of Classification Search
USPC ........................................................ 700/103
See application file for complete search history.

(56) References Cited

U.S. PATENT DOCUMENTS

| | | | | |
|---|---|---|---|---|
| 6,718,291 | B1 * | 4/2004 | Shapiro et al. ...................... 703/2 |
| 7,711,598 | B2 * | 5/2010 | Perkowski ................. 705/14.51 |
| 2002/0198791 | A1 * | 12/2002 | Perkowski ....................... 705/26 |
| 2003/0007000 | A1 * | 1/2003 | Carlson et al. ................ 345/713 |
| 2003/0046089 | A1 * | 3/2003 | Menninger et al. ............... 705/1 |
| 2003/0050845 | A1 * | 3/2003 | Hoffman et al. ................ 705/26 |
| 2003/0060913 | A1 * | 3/2003 | Turner et al. ................... 700/103 |
| 2003/0069774 | A1 * | 4/2003 | Hoffman et al. ................... 705/8 |
| 2004/0143362 | A1 * | 7/2004 | Matthews et al. ............. 700/182 |
| 2004/0264777 | A1 * | 12/2004 | Furuhashi et al. ............. 382/190 |
| 2005/0010475 | A1 * | 1/2005 | Perkowski et al. ............. 705/14 |
| 2005/0113962 | A1 * | 5/2005 | Matthews et al. ............. 700/182 |
| 2005/0203718 | A1 * | 9/2005 | Carek et al. ........................ 703/1 |
| 2005/0209829 | A1 * | 9/2005 | Binzer et al. ....................... 703/1 |
| 2006/0111878 | A1 * | 5/2006 | Pendyala et al. ................... 703/1 |
| 2007/0016890 | A1 * | 1/2007 | Brunner et al. ................ 717/107 |
| 2007/0038947 | A1 * | 2/2007 | Brandl et al. .................. 715/762 |
| 2007/0050235 | A1 * | 3/2007 | Ouimet ........................... 705/10 |
| 2008/0033710 | A1 * | 2/2008 | Turner et al. ..................... 703/27 |
| 2008/0120129 | A1 * | 5/2008 | Seubert et al. ..................... 705/1 |
| 2008/0172208 | A1 * | 7/2008 | Lechine ............................. 703/1 |
| 2009/0089174 | A1 * | 4/2009 | Brunner et al. ................. 705/26 |
| 2009/0093901 | A1 * | 4/2009 | Awile et al. ...................... 700/97 |

(Continued)

OTHER PUBLICATIONS

French Preliminary Research Report issued for FR 0905606 on Jul. 8, 2010, filed Nov. 23, 2009 (1 page).

(Continued)

*Primary Examiner* — Kavita Padmanabhan
*Assistant Examiner* — Patrick Cummins
(74) *Attorney, Agent, or Firm* — Oblon, Spivak, McClelland, Maier & Neustadt, L.L.P.

(57) ABSTRACT

A device and associated method for formulating, via an information technology device having a user interface, a numerical model of manufactured products, the numerical model including components, variables and constraints executes different steps successively. Each step stores, via the information technology device, the predetermined numerical data in order to construct the numerical model in memory. The numerical model may then be used to create a configuration of the manufactured product by making, via a user interface, choices among the structural, technical, manufacturing, and commercial characteristics of the numerical model of the manufactured product.

20 Claims, 56 Drawing Sheets

(56) References Cited

U.S. PATENT DOCUMENTS

| | | | |
|---|---|---|---|
| 2009/0158218 A1* | 6/2009 | Brooks et al. | 715/854 |
| 2009/0254572 A1* | 10/2009 | Redlich et al. | 707/10 |
| 2010/0145773 A1* | 6/2010 | Desai et al. | 705/10 |
| 2010/0306000 A1* | 12/2010 | Green et al. | 705/7 |
| 2010/0325605 A1* | 12/2010 | Ding et al. | 717/105 |
| 2011/0071857 A1* | 3/2011 | Malov et al. | 705/4 |
| 2011/0078650 A1* | 3/2011 | Weber et al. | 717/104 |
| 2011/0098837 A1* | 4/2011 | Yucel et al. | 700/104 |
| 2011/0213480 A1* | 9/2011 | Zila et al. | 700/98 |
| 2012/0089410 A1* | 4/2012 | Mikurak | 705/1.1 |
| 2012/0109350 A1* | 5/2012 | Buchowski et al. | 700/98 |

OTHER PUBLICATIONS

"Cameleon eConfigurator" Oct. 13, 2007, pp. 1-2, XP002591026 http://web.archive.org/web/20071013072110/www.access-commerce.fr/autome_modules_files/ploymod_docs/public/r186_6_ds_cec_fr.pdf.

* cited by examiner

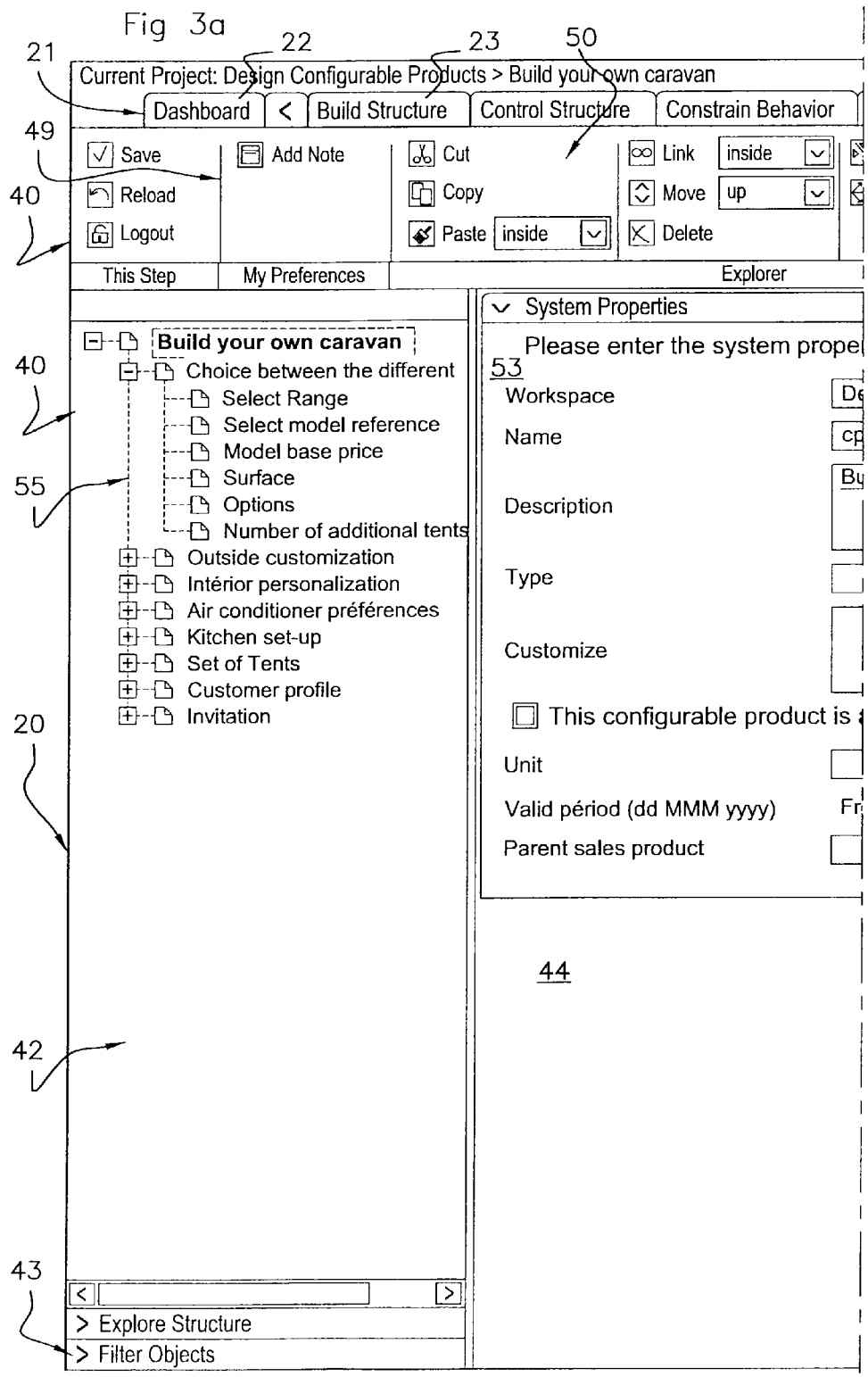

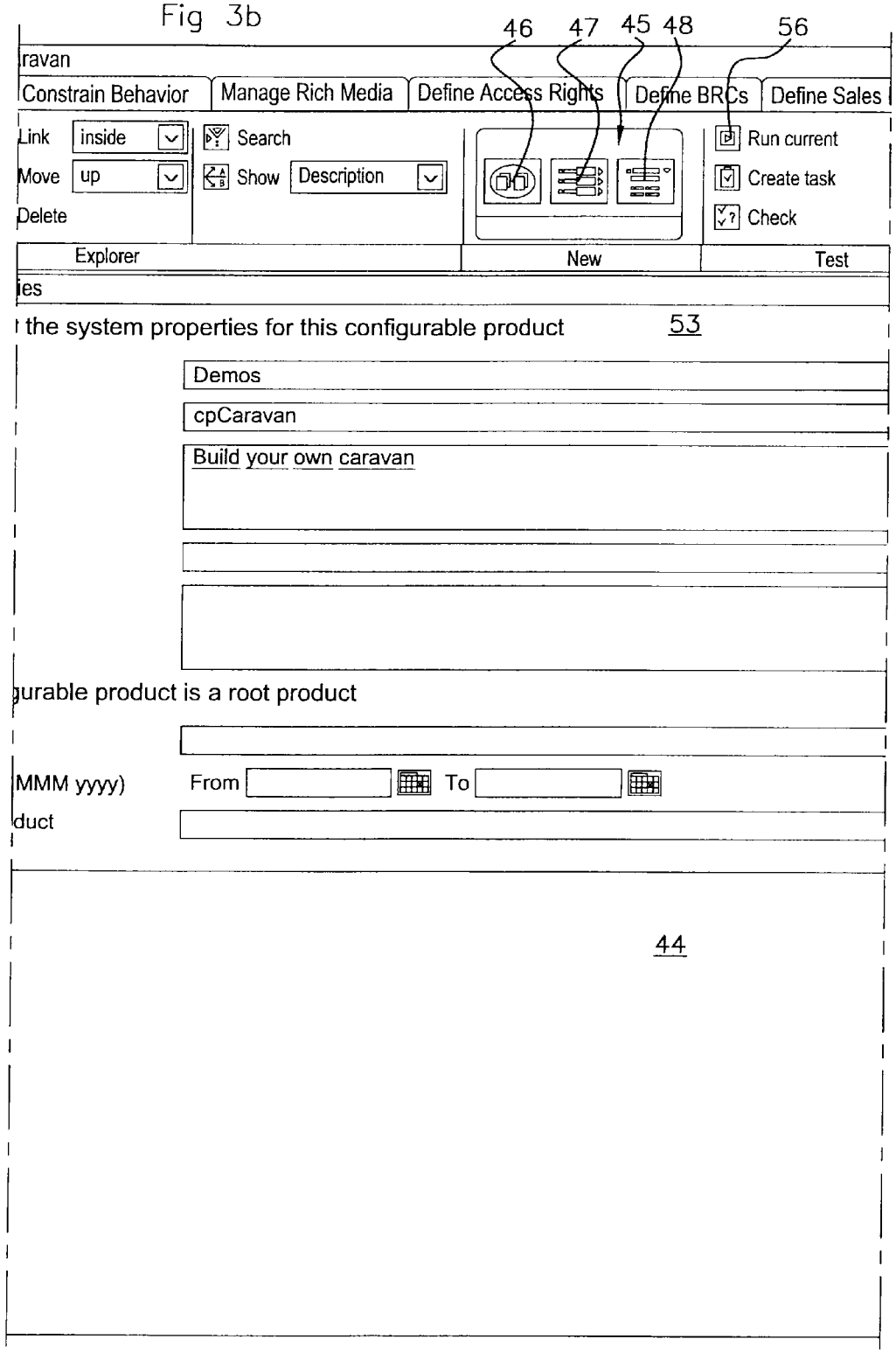

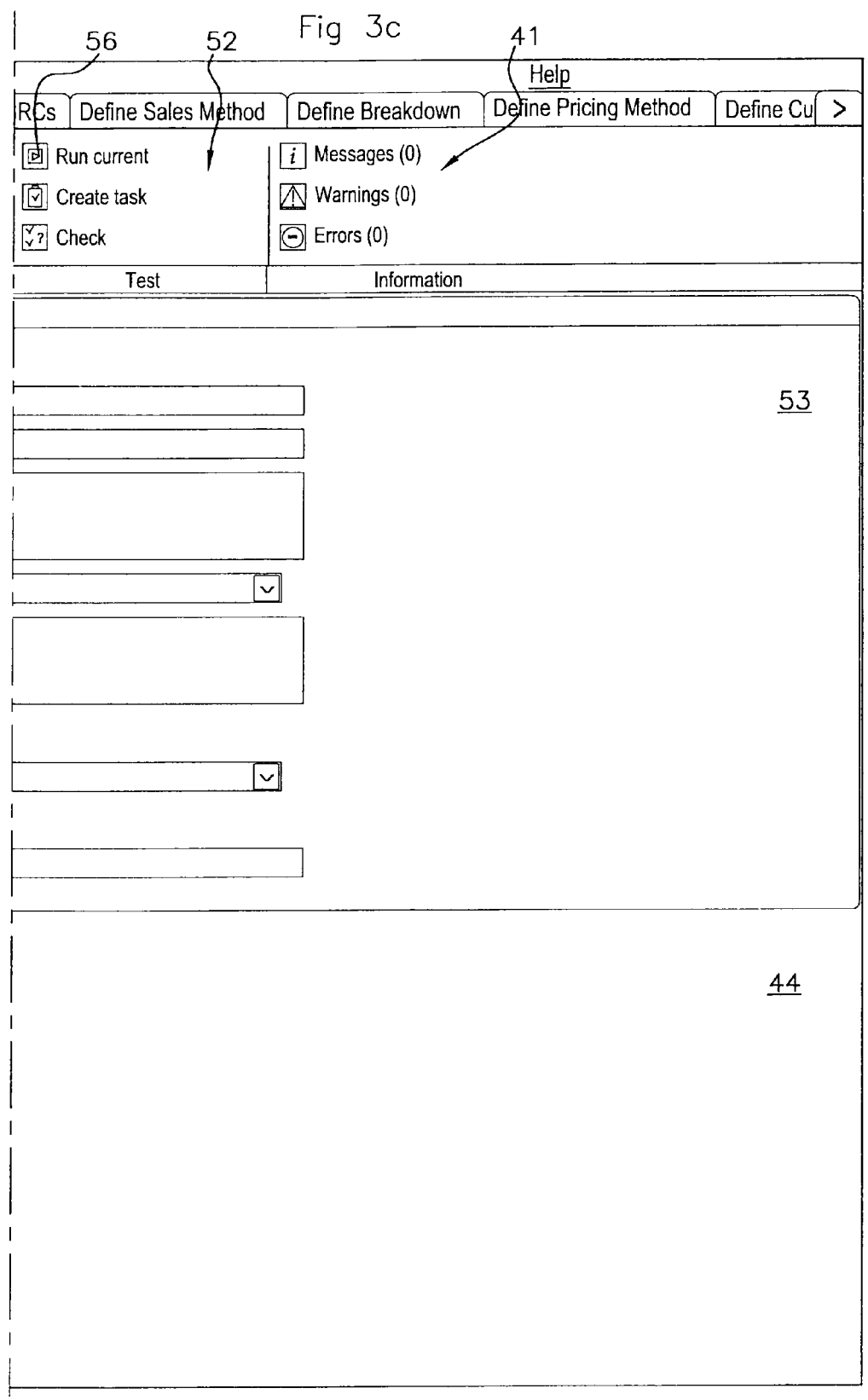

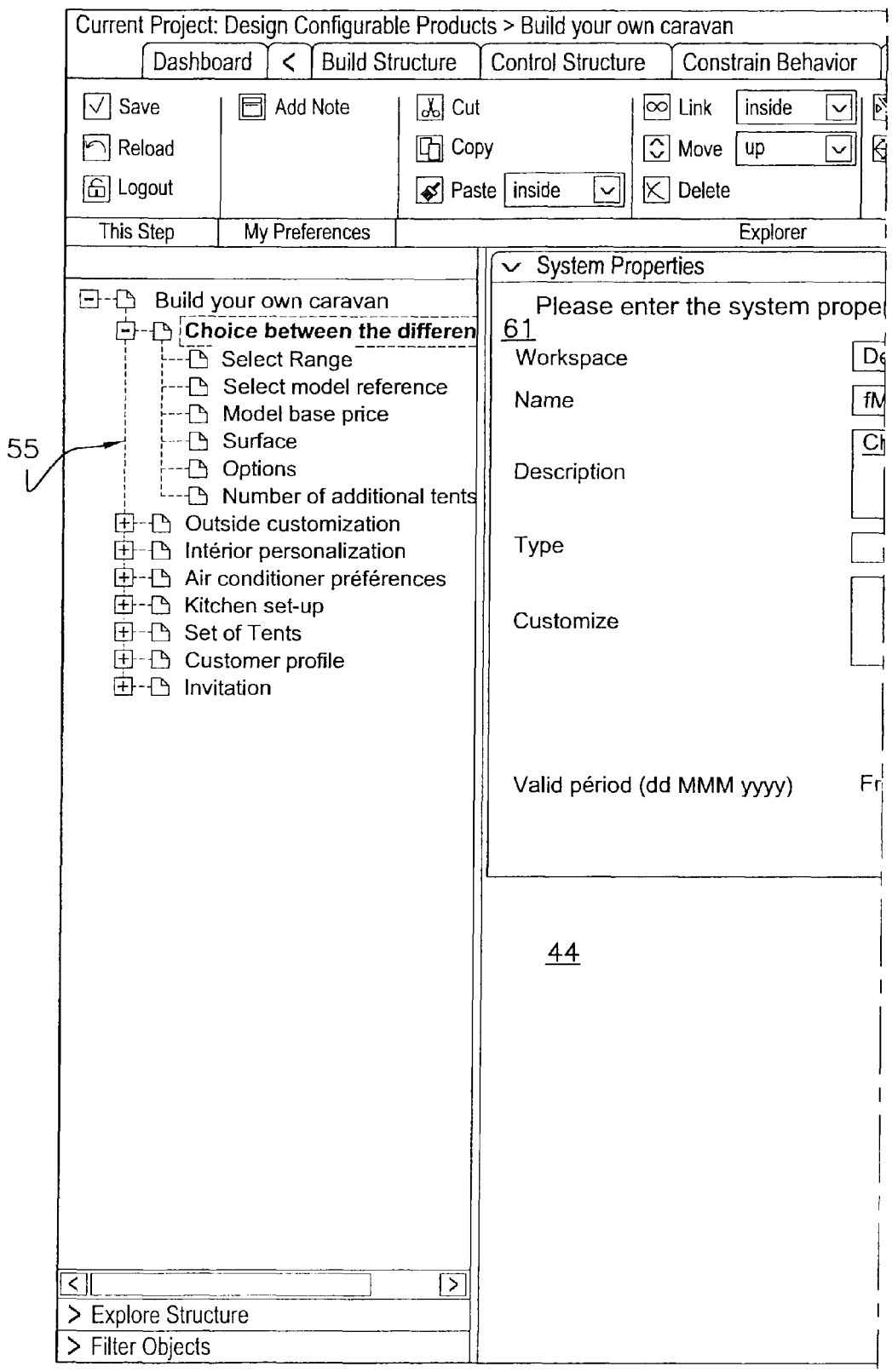

Fig 4b ravan

| Constrain Behavior | Manage Rich Media | Define Access Rights | Define BRCs | Define Sales |

Link inside  Search           Run current
Move up     Show Description  Create task
Delete                        Check

| Explorer | New | Test | ies the system properties for this form          61

Demos fModel

Choice between the different ranges

MMM yyyy)    From [      ] To [      ]

| | Help | | | |
|---|---|---|---|---|
| RCs | Define Sales Method | Define Breakdown | Define Pricing Method | Define Cu > |

- ▷ Run current
- ☑ Create task
- ✓? Check
- i Messages (0)
- ⚠ Warnings (0)
- ⊖ Errors (0)

| Test | Information |
|---|---|

Current Project: Design Configurable Products > Build your own caravan (23)

| Dashboard | < | Build Structure | Control Structure | Constrain Behavior |

- ☑ Save
- ⤺ Reload
- 🔒 Logout
- 📋 Add Note
- ✂ Cut
- 📋 Copy
- 📎 Paste  inside ▾
- ∞ Link  inside ▾
- ↕ Move  up ▾
- ✕ Delete

| This Step | My Preferences | Explorer |

(55)
- ⊟ Build your own caravan
  - ⊟ Choice between the different
    - Select Range
    - Select model reference
    - Model base price
    - Surface
    - Options
    - Number of additional tents
  - ⊞ Outside customization
  - ⊞ Intérior personalization
  - ⊞ Air conditioner préferences
  - ⊞ Kitchen set-up
  - ⊞ Set of Tents
  - ⊞ Customer profile
  - ⊞ Invitation > Explore Structure
> Filter Objects

System Properties
Please enter the system prope[

| Name | fp |
| Type | O| |
| Valuation Mode | Si |
| Layout | R( |
| | S( |
| Description | |
| Type | |
| Customize | |
| Reference Currency | |
| Reference Unit | |

(44)

Valuation
Please define the valuations of this form
(63)

Domain Valuation
| | Fi |
| Value Selection | |
| Lower Bound | |
| Upper Bound | |
| Multiple Of | |
| Default Value | D( |
| |<|< | |

Quantity Valuation
| | Fi |
| Lower Bound | |
| Upper Bound | |

Fig 5b ravan

| Constrain Behavior | Manage Rich Media | Define Access Rights | Define BRCs | Define Sales |

Link  inside ▽    Search                              Collapse All
Move  up ▽       Show  Description ▽                  Expand All
Delete

| Explorer | New | Grid | ies the system properties for this form property

| fpRange |
| Object |
| Simple (one value) |
| Rolling Value Selector |
| Select range |

!ncy

44 valuations of this form property   63
tion

| | Fixed | brcRange | |
|---|---|---|---|
| | | ☑ | |
| | | ☐ | |
| | | ☐ | |
| | | ☐ | |
| | Demos/B | ☐ | | ation

| | Fixed | brcRange | |
|---|---|---|---|
| | | ☐ | |
| | | ☐ | |

Fig 6a

Current Project: Design Configurable Products > Build your own caravan — 24

| Dashboard | < | Build Structure | Control Structure | Constrain Behavior |

- ✓ Save
- ▦ Add Note
- ▧ Search
- ▦ Show | Description ▽ |
- ↶ Reload
- ▢ Copy
- 🔒 Logout
- ✕ Delete

81

| This Step | My Preferences | Explorer |

Explore Structure | ∨ Control Structure

Please enter the system prope[rty]

- ⊟ Build your own caravan
  - ⊟ Choice between the different
    - Select Range
    - Select model reference
    - Model base price
    - Surface
    - Options
    - Number of additional tents
  - ⊞ Outside customization
  - ⊞ Intérior personalization
  - ⊞ Air conditioner préférences
  - ⊞ Kitchen set-up
  - ⊞ Set of Tents
  - ⊞ Customer profile
  - ⊞ Invitation

20

∨ Form Property Control

| 1 | Existence |
| 2 | Computed |
| 3 | Required |
| 4 | Visible |
| 5 | Updatable |

|< <

∨ Quantity Control

| 1 | Existence |
| 2 | Computed |
| 3 | Required |
| 4 | Visible |
| 5 | Updatable |

|< <

∨ Comment Control

| 1 | Existence |
| 2 | Computed |
| 3 | Required |
| 4 | Visible |
| 5 | Updatable |

|< <

> List Control

> Explore Structure
> Filter Objects

| ravan | | | | | |
|---|---|---|---|---|---|
| Constrain Behavior | Manage Rich Media | Define Access Rights | | Define BRCs | Define Sales |
| Description ▼ | BRC Add BRC | | | ▷ Run current | |
| | BRC Paste BRC | | | ☑ Create task | |
| | BRC Remove BRC | brcExistOptions ▼ | 81 | ✓? Check | |
| Explorer | | Control | | | Test | the system properties for this form property

Control

| | Fixed | brcExistOptions | brcVisibleOptions | |
|---|---|---|---|---|
| | ☐ | ☑ | ☐ | |
| | ☐ | ☐ | ☐ | |
| | ☐ | ☐ | ☐ | |
| | ☐ | ☐ | ☑ | |
| | ☑ | ☐ | ☐ | | ol

| | Fixed | brcExistOptions | brcVisibleOptions | |
|---|---|---|---|---|
| | ☐ | ☐ | ☐ | |
| | ▣ | ▣ | ▣ | |
| | ☑ | ▣ | ▣ | |
| | ☑ | ▣ | ▣ | |
| | ☑ | ▣ | ▣ | | trol

| | Fixed | brcExistOptions | brcVisibleOptions | |
|---|---|---|---|---|
| | ☐ | ☐ | ☐ | |
| | ▣ | ▣ | ▣ | |
| | ☑ | ▣ | ▣ | |
| | ☑ | ▣ | ▣ | |
| | ☑ | ▣ | ▣ | |

44

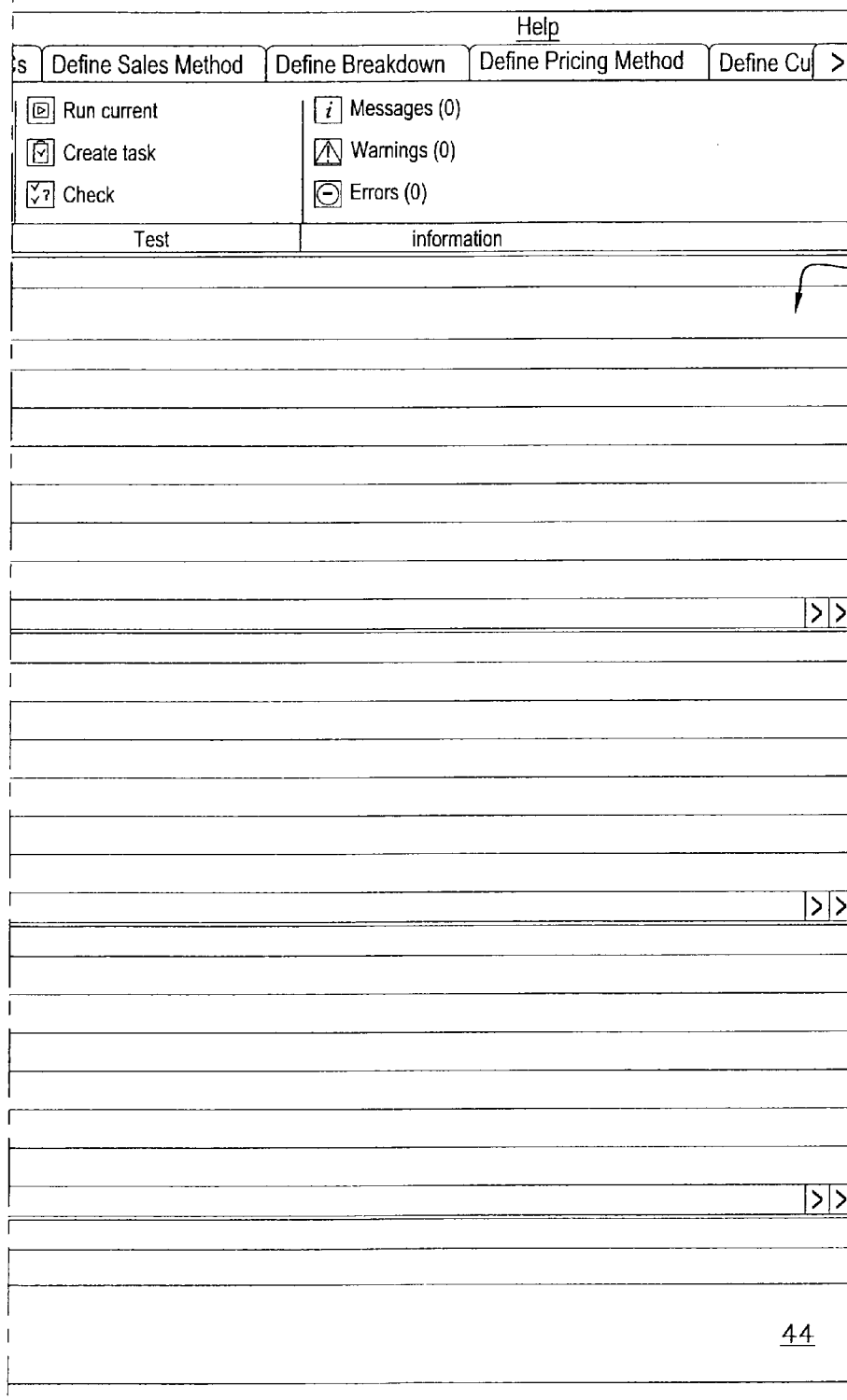

| ravan | | | | |
|---|---|---|---|---|
| Constrain Behavior | Manage Rich Media | Define Access Rights | Define BRCs | Define Sales |

Default view  Maintenance_Manual  ShortText  Warranty_Doc

| Export | Run current | Messages (0) |
|---|---|---|
| Import | Create task | Warnings (0) |
| | | Errors (0) |
| Exchange | Test | information |

101, 44 edia h Media

| pace | Object Name | Object Description | Image |
|---|---|---|---|
| | cpCaravan | Build your own ca... | No URL | ness Values

| pace | Object Name | Object Description | Image |
|---|---|---|---|
| | ALICANTE | Alicante | |
| | AMBIANCE STYLE | Ambiance Style | No URL |
| | ANTARES LUXE | Antares Luxe | No URL |
| | Autre | Autre US | |
| | Beige | Beige | |
| | Blue | Blue | |
| | Carpet | Carpet US | |
| | ELDORADO LUXE | Eldorado Luxe | No URL |
| | Fitted Carpet | Fitted Carpet in re... | |
| | Green | Green | |
| | Havana | Havana | |
| | LEATHER | Leather | |

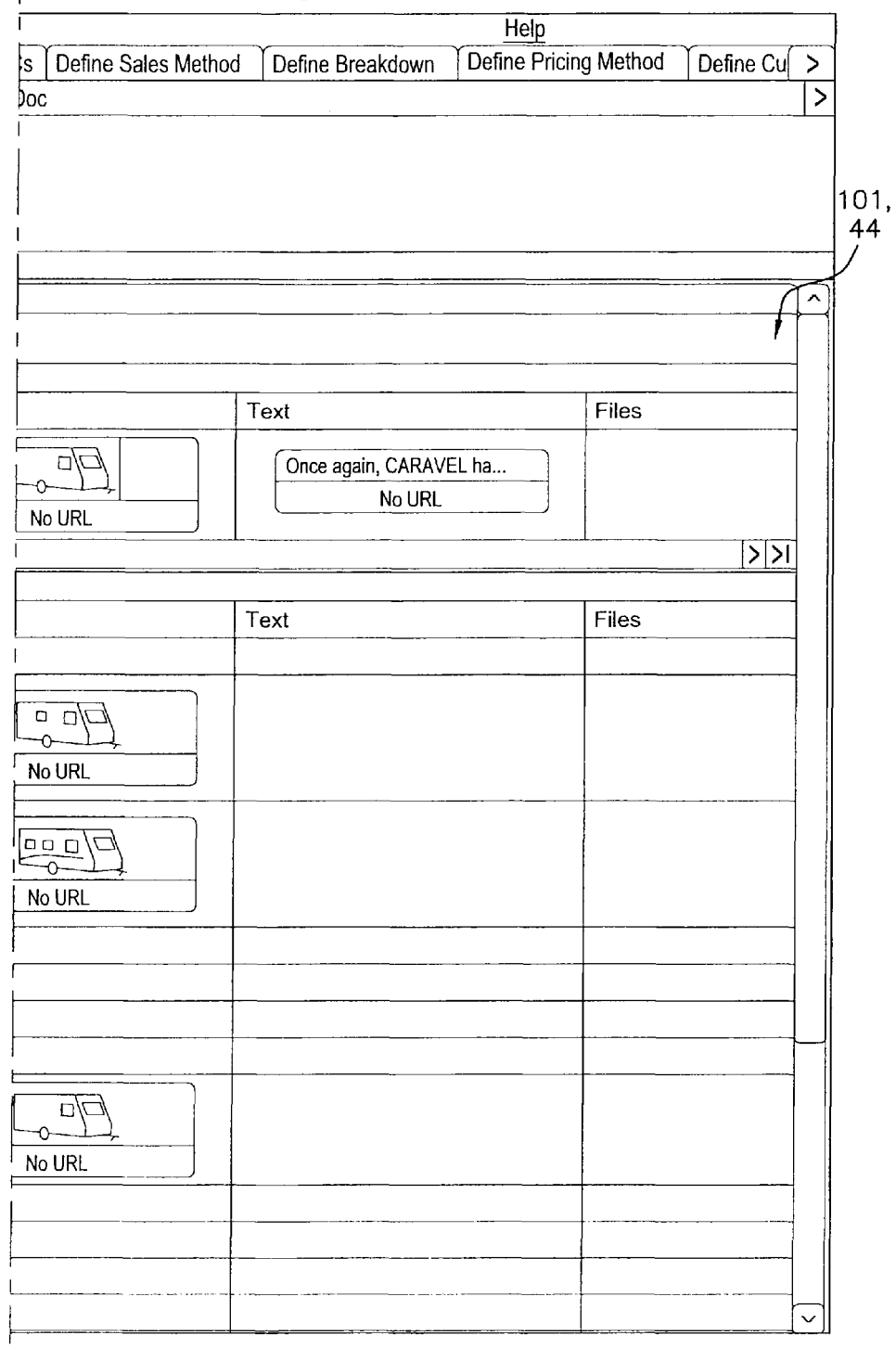

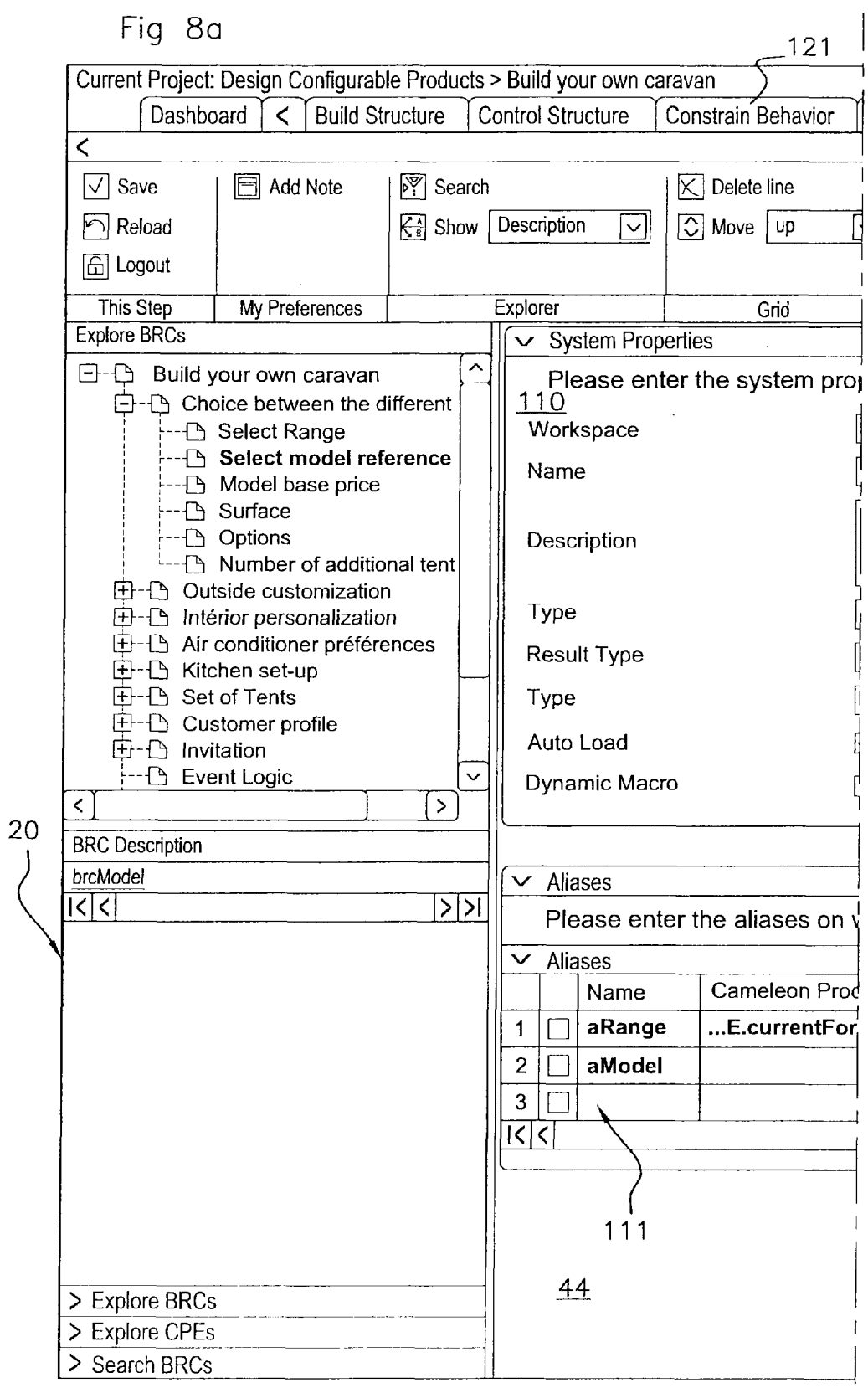

Fig 8b

| ravan | | | | | |
|---|---|---|---|---|---|
| Constrain Behavior | Manage Rich Media | Define Access Rights | Define BRCs | Define Sales | |

Parameters  Business Logic  Explanations

| ☒ Delete line | ▶ Run current | ⓘ Messages (0) |
|---|---|---|
| ↕ Move [up ▼] | ☑ Create task | ⚠ Warnings (0) |
| | ☑? Check | ⊖ Errors (0) |

| Grid | Test | Information |
|---|---|---| erties ter the system property of theBRC       110

| Demos |
|---|
| brcModel |
| brcModel |
| |
| Matrix |
| Include |
| |

☑ ro   ▢ ter the aliases on which the BRC execution depends

| Cameleon Process Expression | Must exist | Must be answered |
|---|---|---|
| ...E.currentForm.FP/fpRange.value | ☑ | ☑ |
| | ☑ | ☐ |
| | ☑ | ☑ |

| RCs | Define Sales Method | Define Breakdown | Define Pricing Method | Define Cu | > |

110

| lst be answered | Type | |
|---|---|---|
| ✓ | Object | |
| ☐ | Text | |
| ✓ | | |

| | | | Help | | |
|---|---|---|---|---|---|
| RCs | Define Sales Method | Define Breakdown | Define Pricing Method | Define Cu | > |

| | | | | > |
|---|---|---|---|---|
| | ▷ Export | ▷ Run current | i Messages (0) | |
| | ◁ Import | ☑ Create task | ⚠ Warnings (0) | < |
| | | ✓? Check | ⊖ Errors (0) | |
| | Exchange | Test | Information | | previously defined aliases

| ion | Op | aModel | Explanation | |
|---|---|---|---|---|
| | = | | | |
| Luxe | = | 340 | | |
| ce Style | = | 410 | | |
| | = | 550 | | |
| b Luxe | = | 680 | | |
| Luxe | = | 370 | | |
| | | | | |
| | | | | |
| | | | | |
| | | | | |
| | | | | |

141

44

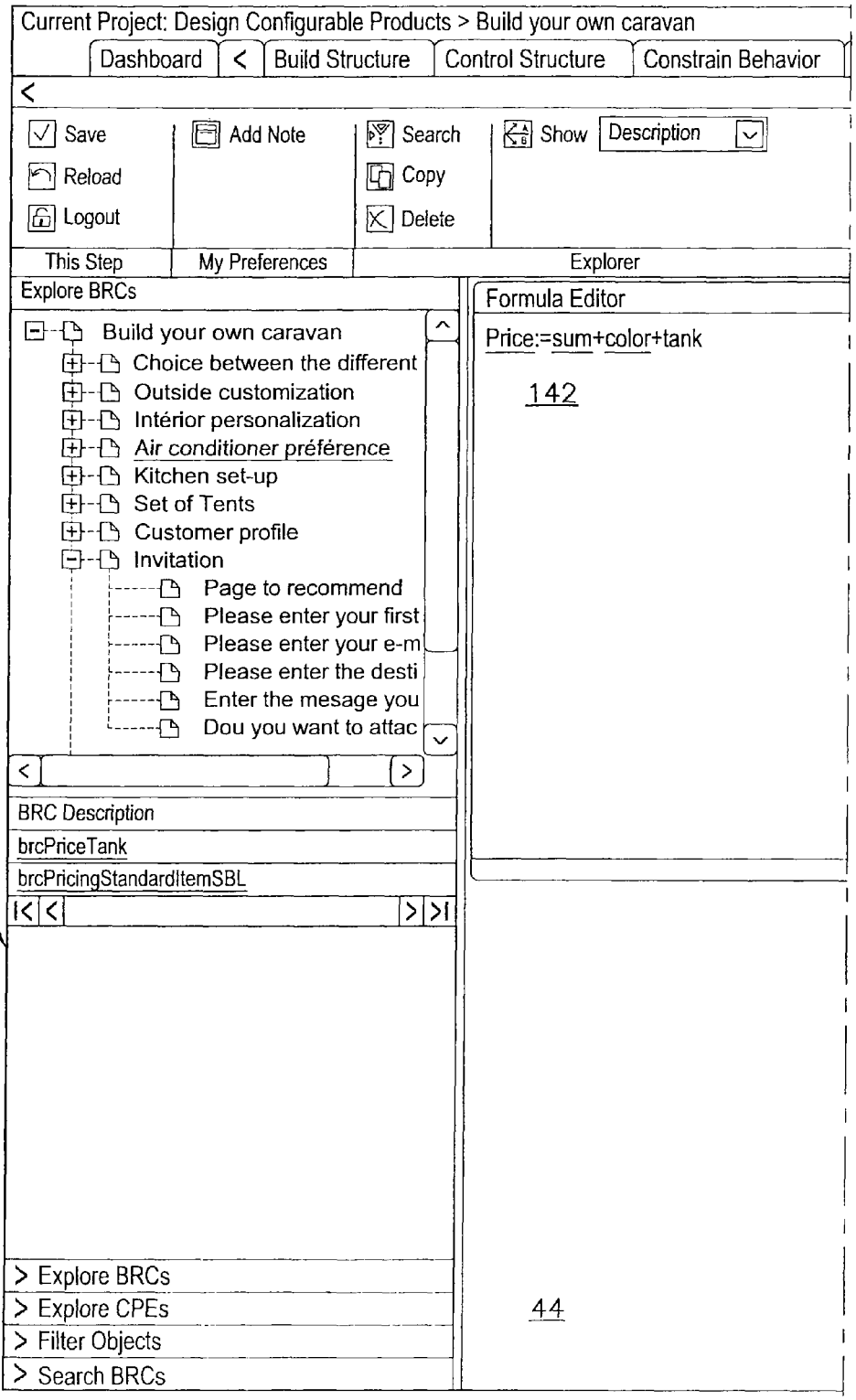

Fig 10b ravan

| Constrain Behavior | Manage Rich Media | Define Access Rights | Define BRCs | Define Sales |

Parameters  Business Logic  Explanations cription ⌄ | ▶ Run current | *i* Messages (0)
| ☑ Create task | ⚠ Warnings (0)
| | ⊖ Errors (0)

Test | Information r+tank

142

44

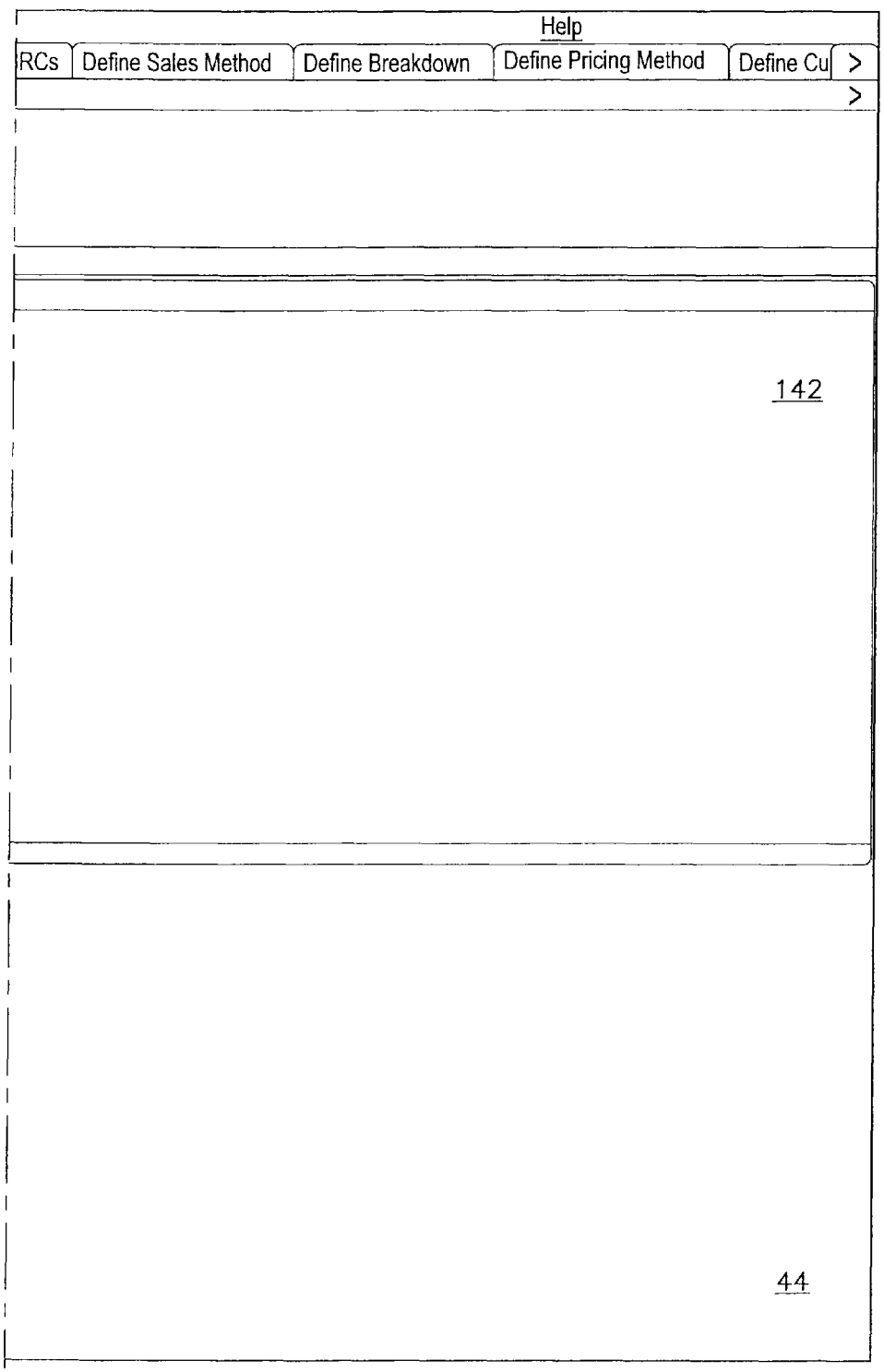

Fig 11b ravan

| Constrain Behavior | Manage Rich Media | Define Access Rights | Define BRCs | Define Sales |

Parameters  Business Logic  Business Data  Explanations cription ▽

Run current  Messages
Create task  Warnings
Check  Errors (0)

New  Test  In cMinMaxTents()

brcMinMaxTents()

[0,0] "aMin"
[0,1] "aMax"
[1,0] aNbTent
[1,1] aNbTent
["NR"] 1
["NC"] 2
Y "tab"

EFINE

143

1, Ch 12 | Total: | Ln 11, Ch 155 cMinMaxTents s()

| | Help | | | |
|---|---|---|---|---|
| RCs | Define Sales Method | Define Breakdown | Define Pricing Method | Define Cu > |

Explanations >

- [i] Messages (0)
- [⚠] Warnings (0)
- [⊖] Errors (0)

Information

143

44

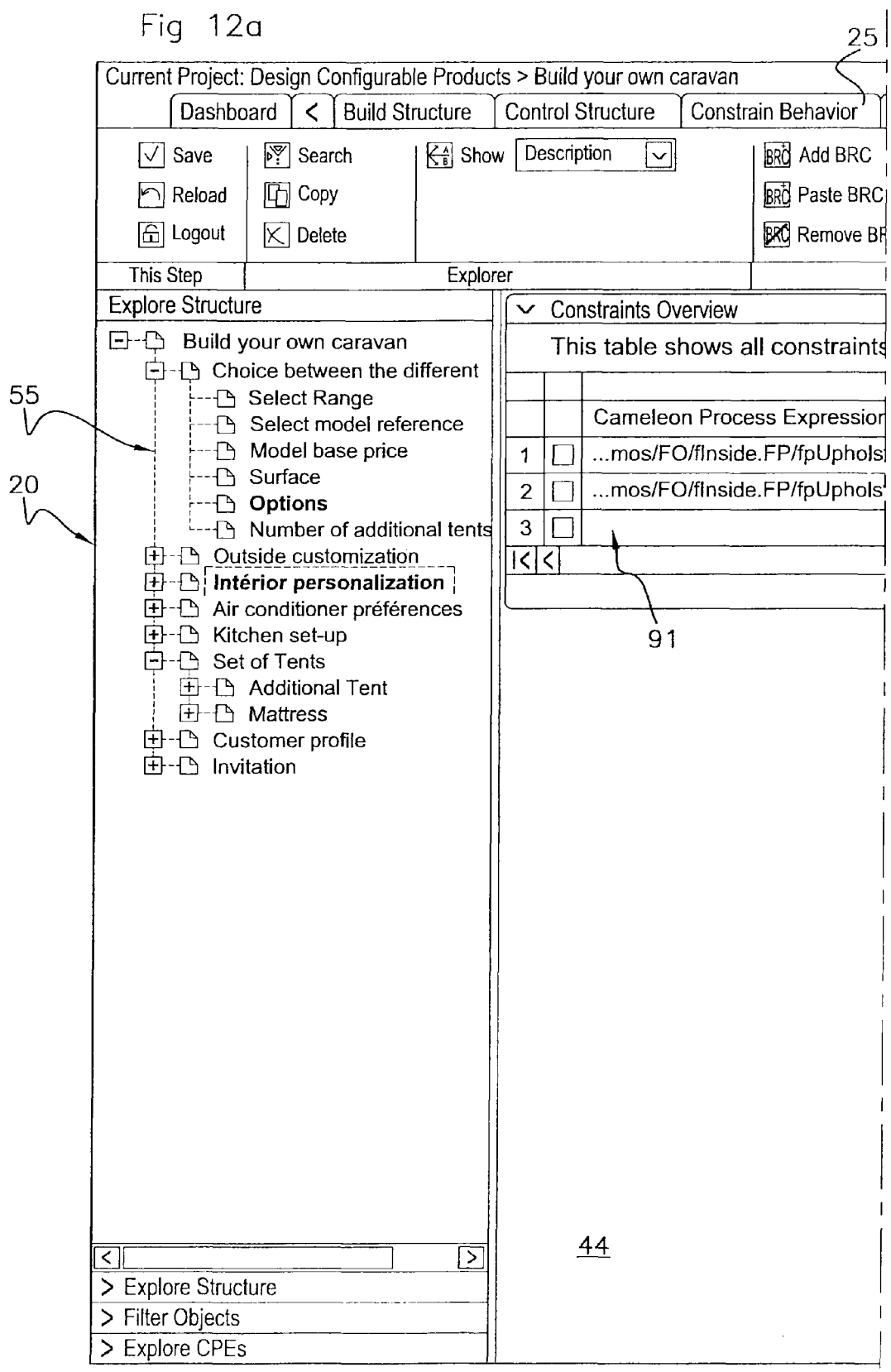

25    Fig 12b ravan

| Constrain Behavior | Manage Rich Media | Define Access Rights | Define BRCs | Define Sales |

- BRC Add BRC
- BRC Paste BRC
- BRC Remove BRC    cstUpholstery ▽
- Run current
- Create task
- Check

| Control | Test | rview lows all constraints for the selected node in the "Explore Structure" explorer tab.

| Process Expression | Type | cstUpholstery |
| --- | --- | --- |
| /fInside.FP/fpUpholsteryModel.value | Object | ☑ |
| /fInside.FP/fpUpholsteryColor.value | Object | ☑ |
|  |  | ☐ |

91

44

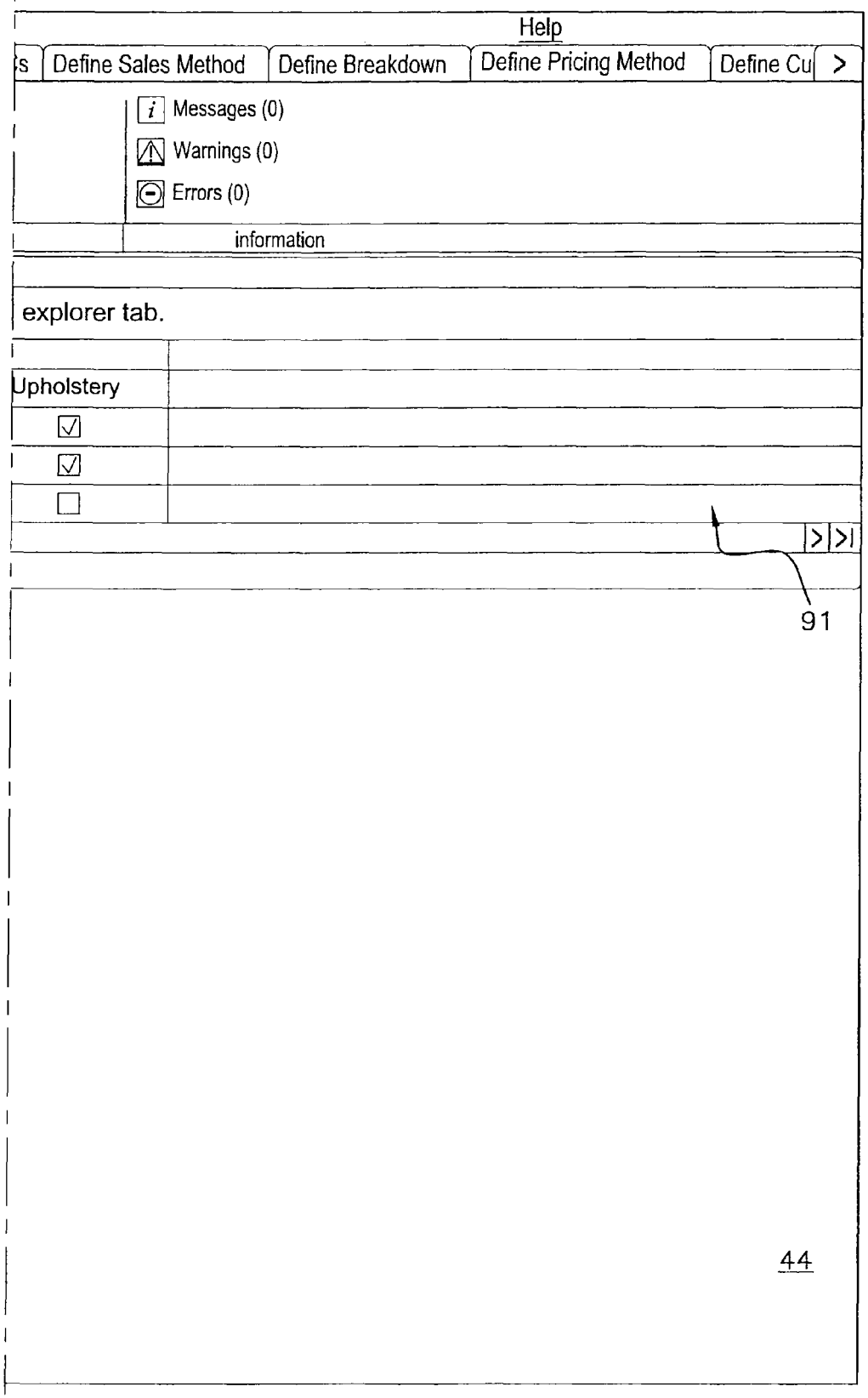

Fig 13b

| ravan | | | | | |
|---|---|---|---|---|---|
| Constrain Behavior | Manage Rich Media | Define Access Rights | | Define BRCs | Define Sales |

27

|  | Select All | Add alias | | Add BRC | |
|---|---|---|---|---|---|
|  | Select None | Change alias | hostCountry ⌄ | Paste BRC | |
|  | Delete line | Remove alias | hostCountry ⌄ | | |

| Grid | Access Rights | Control |
|---|---|---|

Rights access rights of each node, form, form property or constraint in the configurable Rights

| on Process Expression | Operator | hostCountry |
|---|---|---|
| | 160 | |
| emos/CP/cpCaravan.Demos/CP/cpKitche... | = | FR ⌄ |
| emos/CP/cpCaravan.Demos/CP/cpKitche... | in | US,UK |
| | | ⌄ |

| | | | Help | |
|---|---|---|---|---|
| RCs | Define Sales Method | Define Breakdown | Define Pricing Method | Define Cu > |
| dd BRC | ▷ Export | ▷ Run current | *i* Messages (0) | |
| aste BRC | ◁ Import | ✓ Create task | ⚠ Warnings (0) | < |
| | | ✓? Check | ⊖ Errors (0) | |
| Control | Exchange | Test | Information | | the configurable product

| Country | BRC | Fixed | |
|---|---|---|---|
| | | | 160 |
| | ▽ brcArmExHeater | | |
| UK | | true | |
| | ▽ | | |

| | | | | | 29 |
|---|---|---|---|---|---|
| ravan | | | | | |
| Constrain Behavior | Manage Rich Media | Define Access Rights | Define BRCs | Define Sales | |

- Copy
- Delete
- Search

Show [Description ▾]

- Show / Hide Cols
- Reorder Cols

| Explorer | New | Grid |
|---|---|---| ss Rights es method: smEurope

| me | Exists | Visible | Quantity | Quantity Rule | Context |
|---|---|---|---|---|---|
| al | | | | | |
| ndard items | | | | | |
| avan | | | | | |
| conditioner | brcExAircoline | | | | |
| hen burner | brcExKitchen... | | | | |
| rm | brcExAlarm | | | | |
| | | | | | CPE.CP/cpCarava |
| t | | | | | |
| ttress | | | | | CPE.currentSBL.p |

| Current Project: Design Configurable Products > Build your own caravan |
|---|

| Dashboard | < | Build Structure | Control Structure | Constrain Behavior |
|---|---|---|---|---|

<

| ☑ Save | 🗐 Add Note | 🔍 Search | BRC Add BRC | ✂ Remov |
|---|---|---|---|---|
| ↺ Reload | | 📋 Copy | BRC Paste BRC | ✂ Remov |
| 🔒 Logout | | ✖ Delete | | |

| This Step | My Preferences | Explorer | Co |
|---|---|---|---|

Explore Complete Matching | ∨ Complete matching for line total#sta

171 →

- 🗎 Buid your own caravan
  - 🗎 total
    - 🗎 standard items
      - 🗎 caravan
      - 🗎 air conditioner
      - 🗎 kitchen burner
      - 🗎 ⌐alarm⌐
    - 🗎 kit
      - 🗎 ⌐tent⌐
      - 🗎 mattress

180

Define...

System Properties

| | Active | System property |
|---|---|---|
| 1 | ☑ | Workspace |
| 2 | ☑ | Class |
| 3 | ☐ | Name |
| 4 | ☐ | Description |
| 5 | ☐ | Parent wks |
| 6 | ☐ | Parent name |

|<| < |

∨ Prices

Please the drop price method

∨ Business Property Sets

Please drop the business pr

Tent characteristics

| | Active | System property |
|---|---|---|
| 1 | ☑ | Number of persons su |
| 2 | ☑ | Type of tent |
| 3 | ☑ | Tent color |

|<| < |

20

> Explore Partial Matching
> Explore Complete Matching
> Explore Codification
> Explore Sales Information
> Filter Objects

| ravan | | | | | |
|---|---|---|---|---|---|
| Constrain Behavior | Manage Rich Media | Define Access Rights | | Define BRCs | Define Sales |

Sales Method Europe

| Add BRC | Remove Price Method | | Activate selected |
|---|---|---|---|
| Paste BRC | Remove BP Set | Tent characteristi ⌄ | Unactivate selected |

| Control | Activate Lines |
|---|---| atching for line total#standard items#kit#tent

| es | |
|---|---|
| stem property | Operator |
| rkspace | = |
| ss _180_ | = |
| me | = |
| scription | = |
| ent wks | = |
| ent name | = | drop price method item from the filter objects pane perty Sets p the business property set item from the filter objects pane

| tics | | |
|---|---|---|
| stem property | Operator | Operator |
| mber of persons supported by this tent | INTEGER | |
| e of tent | TEXT | = |
| t color | TEXT | = |

| RCs | Define Sales Method | Define Breakdown | Define Pricing Method | Define Cu | > |

Help tivate selected | Run current | Messages (0)
activate selected | Create task | Warnings (0)
| Check | Errors (0)

| Activate Lines | Test | Information |

| rator | Value | BRC |
|---|---|---|
| | Demos | |
| | Standard item | 180 |
| | | |
| | | |
| | | |

| Operator | Value | BRC |
|---|---|---|
| | | brcMatchingNt |
| = | Standard item | brcMatchingTe |
| = | | brcMatchingCo |

| Current Project: Design Configurable Products > Build your own caravan |
| --- |

| Dashboard | < | n Behavior | Manage Rich Media | Define Access Rights | De |

<

- ✓ Save
- 🔍 Search
- ▦ Insert line  Before ▽
- BRC Add BRC
- ⤴ Reload
- Show  Description ▽
- ✗ Delete line
- BRC Paste BR
- 🔒 Logout

| This Step | Explorer | Grid | Control |
| --- | --- | --- | --- |

Explore Customer Price

⊟─ Buid your own caravan
  ⊟─ total
    ⊟─ standard items ← 171
      ─ caravan
      ─ air conditioner
      ─ kitchen burner
      ─ alarm    ← 190
    ⊞─ kit ∨ Define Pricing Matrix for line: standa Define the intermediate and ∨ Intermediate Variable

|   |   | Variable Name | Variable D |
| --- | --- | --- | --- |
| 1 | ☐ | tank | tank |
| 2 | ☐ | color | color |
| 3 | ☐ | sum | sum |

|◁ ◁

∨ Resulting Variable

|   |   | Range | Initial Value | BRC |
| --- | --- | --- | --- | --- |
| 1 | ☐ | 1 | 1.0 | brcP |

|◁ ◁

Map of Costumer Price (Sales Method:

Pricing Matrix
line: standard items

20

> Explore Customer Price
> Filter Objects

| ravan | | | | |
|---|---|---|---|---|
| he Access Rights | Define BRCs | Define Sales Method | Define Breakdown | Define Pricing Me |

Sales Method Europe

| ore ⌄ | BRC Add BRC | ▷ Run current | *i* Messages (0) |
|---|---|---|---|
| | BRC Paste BRC | ☑ Create task | ⚠ Warnings (0) |
| | | ☑? Check | ⊖ Errors (0) |
| | Control | Test | Information | g Matrix for line: standard items intermediate and the Resulting Variable of the Pricing Matrix Variable

| e Name | Variable Description | Initial Value | Sum of Children | | Prici |
|---|---|---|---|---|---|
| | tank | 1.0 | | ☐ | |
| | color | 1.0 | 190 | ☐ | |
| | sum | 1.0 | | ☑ | | riable

| | Initial Value | BRC | |
|---|---|---|---|
| | 1.0 | brcPricingStandar... | | r Price (Sales Method: Sales Method Europe)

ems

Pricing Grid
line: standard items
variable: color

44

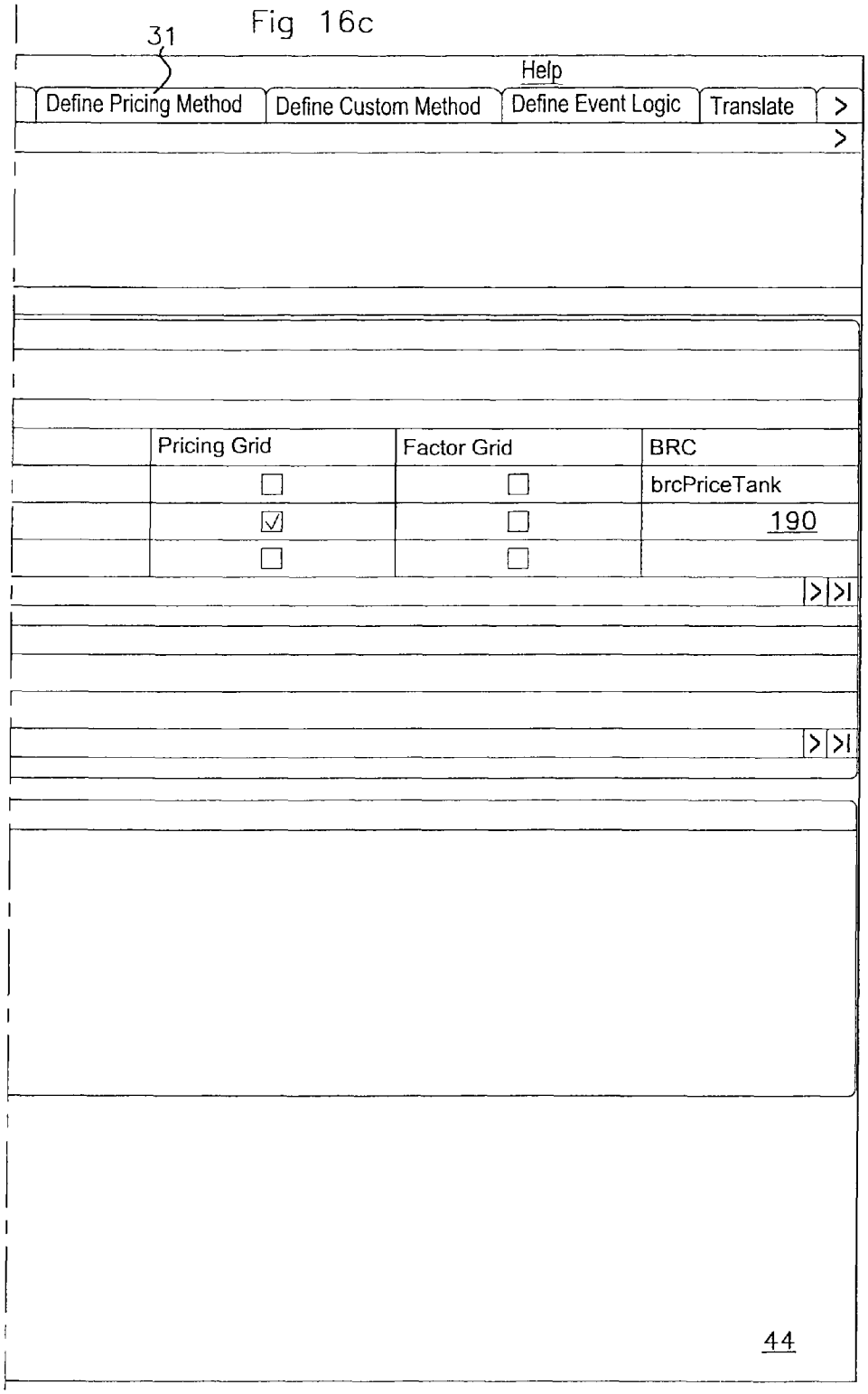

Fig 17a

| Current Project: Design Configurable Products > Build your own caravan |
| --- |
| Dashboard \| < \| n Behavior \| Manage Rich Media \| Define Access Rights \| D( |

- ☑ Save
- 🔍 Search
- 📇 Insert line [Before ▽]
- BRC Add BRC
- ↶ Reload
- Show [Description ▽]
- ☒ Delete line
- BRC Paste BR
- 🔒 Logout

| This Step | Explorer | Grid | Control |
| --- | --- | --- | --- |

Explore Surface Method

- ⊟ Buid your own caravan  200
  - ⊟ total
    - ⊟ standard items
      - caravan
      - air conditioner
      - kitchen burner
      - alarm
    - ⊟ kit
      - Tent
      - mattress ∨ Define Custom Matrix for line: kit Define the intermediate and ∨ Intermediate Variable

| | | Variable Name | Variable D |
| --- | --- | --- | --- |
| 1 | ☐ | sum | sum |

|<|<|

∨ Resulting Variable

| | | Range | Initial Value | BRC |
| --- | --- | --- | --- | --- |
| 1 | ☐ | 1 | 1.0 | brcS |

|<|<|

Map of Surface Method (Sales Breakdc

Custom Matrix
line: kit

20

> Explore Surface Method
> Explore LeadTime Method
> Filter Objects

| ravan | | | | |
|---|---|---|---|---|
| he Access Rights | Define BRCs | Define Sales Method | Define Breakdown | Define Pricing Me |

| Sales Method Europe | | | |
|---|---|---|---|
| ore ⌄ | BRC Add BRC | ▷ Run current | i Messages (0) |
| | BRC Paste BRC | ☑ Create task | ⚠ Warnings (0) |
| | | ☑? Check | ⊖ Errors (0) |
| | Control | Test | Information | m Matrix for line: kit intermediate and the Resulting Variable of the Custom Matrix

| Variable | | | 200 |
|---|---|---|---|
| e Name | Variable Description | Initial Value | Sum of Children |
| | sum | 1.0 | sum | riable

| | Initial Value | BRC | |
|---|---|---|---|
| | 1.0 | brcSurfaceCu... | |

Method (Sales Breakdown: Sales Method Europe)

44

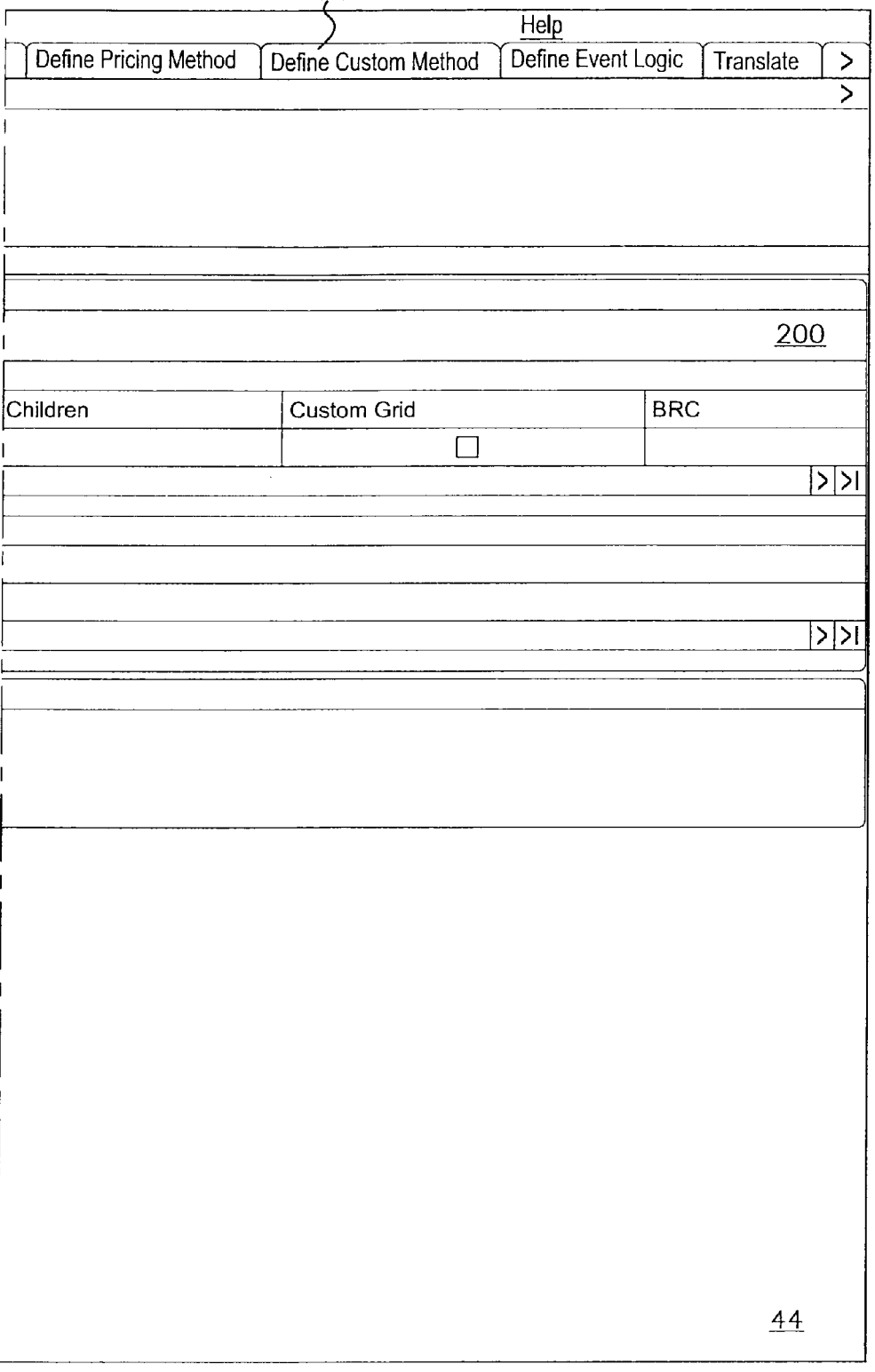

Fig 18a

| Current Project: Design Configurable Products > Build your own caravan |
|---|

| Dashboard | < | Constrain Behavior | Manage Rich Media | Define Access Ri |

✓ Save   ▭ Add Note   ⧉ Show  Description ▼   ✕ Delete line
↶ Reload                                         ▦ Freeze Cols
🔒 Logout

| This Step | My Preferences | Explorer | Grid |

Explore Surface Method

- ⊟ Build your own caravan  211
  - ⊟ Choice between the different ran
    - Select Range
    - Select model reference
    - Model base price
    - Surface
    - Options
    - Number of additional tents
  - ⊞ Outside customization
  - ⊞ Intérior personalization
  - ⊞ Air conditioner préferences
  - ⊞ Kitchen set-up
  - ⊞ Set of Tents
  - ⊞ Customer profile
  - ⊞ Invitation

20

> Explore Structure

∨ Define Event Logic

Define Event Logic

∨ Configurable Product

|   |   | All | Name |
|---|---|---|---|
| 1 | ☐ | ▣ | cpCaravan |
| 2 | ☐ | ▣ | cpCaravan.cpTer |
| 3 | ☐ | ☐ |  |

|<|<|

∨ Forms

|   |   | All | Name |
|---|---|---|---|
| 1 | ☐ | ▣ | cpCaravan.fAirCond |
| 2 | ☐ | ☐ |  |

|<|<|

∨ Configurable Product

|   |   | All | Name |
|---|---|---|---|
| 1 | ☐ | ▣ | ...an.cpTent.fTent.fp |
| 2 | ☐ | ☐ |  |

|<|<|

Map of Surface Method (Sales Breakdo

Event Logic Matrix
< Matrix

| dia | Define Access Rights | Define BRCs | Define Sales Method | Define Breakdown | Define |

- Delete line
- Freeze Cols
- Export
- Import
- Run current
- Create task
- Check
- Messages (0)
- Warnings (0)
- Errors (0)

| Grid | Exchange | Test | Information |

Logic ent Logic

Product     211

| Name | Description | cpe |
|---|---|---|
| cpCaravan | Build your own caravan | CPE.Demos/CP/cpCaravan |
| cpCaravan.cpTent | Set of Tents | CPE.Demos/CP/cpCaravan. |
| | | |

| Name | Description | cpe |
|---|---|---|
| cpCaravan.fAirConditioner | Air conditioner preferences | CPE.Demos/CP/cpCaravan. |
| | | |

Product

| Name | Description | cpe |
|---|---|---|
| ...an.cpTent.fTent.fpNbPersons | Numbers of Persons | CPE.Demos/CP/cpCaravan. |
| | | |

Method (Sales Breakdown: Sales Method Europe)

| Matrix | On Complete<br>cpCaravan<br>1 event(s) | On Complete<br>cpCaravan.cpTent<br>1 event(s) | On<br>cpC<br>1 e |

| | | | | 32 | |
|---|---|---|---|---|---|
| | | | Help | | |
| eakdown | Define Pricing Method | Define Custom Method | Define Event Logic | Tr | > | essages (0)

arnings (0)

rors (0)

Information

<u>211</u>

| | On Change | On Complete | On Error | On Activate | On Cus |
|---|---|---|---|---|---|
| os/CP/cpCaravan | ☐ | ☑ | ☐ | ☐ | |
| os/CP/cpCaravan.Dem. | ☐ | ☑ | ☐ | ☐ | |
| | ☐ | ☐ | ☐ | ☐ | |

>|>|

| | On Change | On Complete | On Error | On Activate | On Cus |
|---|---|---|---|---|---|
| os/CP/cpCaravan.Dem. | ☐ | ☑ | ☐ | ☐ | |
| | ☐ | ☐ | ☐ | ☐ | |

>|>|

| | On Change | On Complete | On Error | On Activate | On Cus |
|---|---|---|---|---|---|
| os/CP/cpCaravan.Dem. | ☑ | ☐ | ☐ | ☐ | |
| | ☐ | ☐ | ☐ | ☐ | |

>|>|

| | On Exists<br>cpCaravan.fAirConditioner<br>1 event(s) | On Complete<br>cpCaravan.fAirConditioner<br>1 event(s) | < |
|---|---|---|---|

| Current Project: Design Configurable Products > Build your own caravan |
|---|

| Dashboard | < | n Behavior | Manage Rich Media | Define Access Rights | D( |

| ☑ Save | 🔠 Show Description ▽ | 🔲 Grid Size | | 📤 Source |
| 🔄 Reload | | | | 📥 Destinatio |
| 🔒 Logout | | | | |

| This Step | Explorer | Grid | |
|---|---|---|---|

Explore Structure

⊟—🗋 Build your own caravan
　⊟—🗋 Choice between the different ran
　　├—🗋 Select Range
55 　├—🗋 Select model reference
　　├—🗋 Model base price
　　├—🗋 Surface
　　├—🗋 Options
　　└—🗋 Number of additional tents
　⊞—🗋 Outside customization
　⊞—🗋 Intérior personalization
　⊞—🗋 Air conditioner préférences
　⊞—🗋 Kitchen set-up
　⊞—🗋 Set of Tents
　⊞—🗋 Customer profile
　⊞—🗋 Invitation

20

> Explore Structure

| | ˅ Translate | 221,44 |
|---|---|---|
| | Define Event Logic | |

| | | Object Name |
|---|---|---|
| 1 | ☐ | Demos/BRC/brcArmExHeat |
| 2 | ☐ | Demos/BRC/brcExAirco |
| 3 | ☐ | Demos/BRC/brcExMattress |
| 4 | ☐ | Demos/BRC/brcExTent |
| 5 | ☐ | Demos/BRC/brcMinMattress |
| 6 | ☐ | Demos/BRC/brcMinMaxTen |
| 7 | ☐ | Demos/BRC/cstModelSeats |
| 8 | ☐ | Demos/BVAL/ALICANTE |
| 9 | ☐ | Demos/BVAL/AMBIANCE S |
| 10 | ☐ | Demos/BVAL/ANTARES LU |
| 12 | ☐ | Demos/BVAL/Beige |
| 13 | ☐ | Demos/BVAL/Blue |
| 15 | ☐ | Demos/BVAL/ELDORADO L |
| 16 | ☐ | Demos/BVAL/FittedCarpet |
| 17 | ☐ | Demos/BVAL/Green |
| 18 | ☐ | Demos/BVAL/Havana |
| 19 | ☐ | Demos/BVAL/LEATHER |
| 20 | ☐ | Demos/BVAL/LivingCarpet |
| 21 | ☐ | Demos/BVAL/OSIRIS |
| 22 | ☐ | Demos/BVAL/Salmon |
| 23 | ☐ | Demos/BVAL/Range |
| 24 | ☐ | Demos/BVAL/color |
| 25 | ☐ | Demos/BVAL/factor |
| 25 | ☐ | Demos/BVAL/factor |
| 26 | ☐ | Demos/BVAL/max |
| 26 | ☐ | Demos/BVAL/max |

Fig 19b ravan

| he Access Rights | Define BRCs | Define Sales Method | Define Breakdown | Define Pricing Me |

Source — English (United States) — Export — Run current
Destination — French (France) — Import — Create task Languages — Exchange — Test ent Logic 221,44

| ct Name | Parent Object Name | Object Type |
| --- | --- | --- |
| s/BRC/brcArmExHeater | - | BRC |
| s/BRC/brcExAirco | - | BRC |
| s/BRC/brcExMattress | - | BRC |
| s/BRC/brcExTent | - | BRC |
| s/BRC/brcMinMattress | - | BRC |
| s/BRC/brcMinMaxTents | - | BRC |
| s/BRC/cstModelSeats | - | BRC |
| s/BVAL/ALICANTE | - | Business Value |
| s/BVAL/AMBIANCE STYLE | - | Business Value |
| s/BVAL/ANTARES LUXE | - | Business Value |
| s/BVAL/Beige | - | Business Value |
| s/BVAL/Blue | - | Business Value |
| s/BVAL/ELDORADO LUXE | - | Business Value |
| s/BVAL/FittedCarpet | - | Business Value |
| s/BVAL/Green | - | Business Value |
| s/BVAL/Havana | - | Business Value |
| s/BVAL/LEATHER | - | Business Value |
| s/BVAL/LivingCarpet | - | Business Value |
| s/BVAL/OSIRIS | - | Business Value |
| s/BVAL/Salmon | - | Business Value |
| s/BVAL/Range | - | Business Variable |
| s/BVAL/color | - | Business Variable |
| s/BVAL/factor | - | Business Variable |
| s/BVAL/factor | - | Business Variable |
| s/BVAL/max | - | Business Variable |
| s/BVAL/max | - | Business Variable |

Fig 20a

Current Process: Design Configurator > Laptop

Dashboard | < | ...ethod | Define Event Log

- ✓ Save
- ↶ Reload
- H Show/hide Cols ▾
- ⟡ Expand All
- ⊠ Collapse All
- ▦ Select | All
- ⊞ Action

| This Step | Grid |

Explore Structure

∨ Laptop
    ⊟ Build my laptop
        ▫ Processor
        ▫ LCD Panel
        ▫ Hard Drive
    ⊞ Accessories
    ⊞ Software
    ⊞ Services 231,44

∨ Define Event Logic

Bla Bla

∨ catalogProcess.Ro(

| # | | ObjectN: |
|---|---|---|
| 1 | ☑ | catalogName |
| 2 | ☑ | adContainerNan |
| 3 | ☐ | rmoName |

∨ catalogProcess.Ro(

| # | | ObjectN: |
|---|---|---|
| 1 | ☑ | catalogName |
| 2 | ☑ | adContainerNan |
| 3 | ☐ | rmoName |

∨ catalogProcess.Ro(

| # | | ObjectN: |
|---|---|---|
| 1 | ☑ | universeName |
| 2 | ☑ | rmoName |
| 3 | ☐ | rmoName |

> catalogProcess.Root.(

∨ catalogProcess.Ro(

| # | | ObjectN: |
|---|---|---|
| 1 | ☑ | BRCName |
| 2 | ☑ | BRCName |
| 3 | ☑ | BRCName |
| 4 | ☑ | BRCName |
| 5 | ☑ | BRCName |

> Explore Structure
> Filter Objects

Fig 20b

| Laptop | | | Help |
|---|---|---|---|

| ne Event Logic | Define BRCs | Define UI Layout | Share B |
|---|---|---|---|
| ▦ Select [All ▽] | ☐ Validate [yes ▽] | | ↗ Export ▼ |
| ⊞ Action [ ▽] | ☐ Mark as Private [no ▽] | | ↘ Import ▼ |
| | ☑ Create task | | |
| | Validate | | Exchange | ne Event Logic

Bla                              231,44 alogProcess.Root

| ObjectName | ObjectDescription | Validate |
|---|---|---|
| catalogName | description | ☑ |
| adContainerName | | ☑ |
| rmoName | | ☑ | alogProcess.Root.Category1

| ObjectName | ObjectDescription | Validate |
|---|---|---|
| catalogName | description | ☐ |
| adContainerName | | ☐ |
| rmoName | | ☐ | alogProcess.Root.Category1.Universe1

| ObjectName | ObjectDescription | Validate |
|---|---|---|
| universeName | description | ☐ |
| rmoName | | ☐ |
| rmoName | | ☐ | logProcess.Root.Cate alogProcess.Root.ARM

| ObjectName | ObjectDescription | Validate |
|---|---|---|
| BRCName | description | ☐ |
| BRCName | description | ☐ |
| BRCName | description | ☐ |
| BRCName | description | ☐ |
| BRCName | description | ☐ |

Fig 20c

| | | | 38 |
|---|---|---|---|
| Help | About Cameleon Modeling | | |

| ut | Share Business Data | Translate | Test | Validate |
|---|---|---|---|---|

| ↗ Export ▼ | Information (No Message) |
|---|---|
| ↘ Import ▼ | Warnings (5 Messages) |
| | Errors (No Message) |
| Exchange | Information |

231,44

| Validate | Private | Private | Users |
|---|---|---|---|
| ☑ | ☐ | Modified | John DOE, Paul SMITH |
| ☑ | ☐ | Created | John DOE, Paul SMITH |
| ☑ | ☐ | Modified | John DOE, Paul SMITH |

| Validate | Private | Private | Users |
|---|---|---|---|
| ☐ | ☐ | Modified | Paul SMITH |
| ☐ | ☐ | Created | Paul SMITH |
| ☐ | ☐ | Deleted | John DOE |

| Validate | Private | Private | Users |
|---|---|---|---|
| ☐ | ☑ | Modified | John DOE |
| ☐ | ☐ | Modified | John DOE |
| ☐ | ☐ | Modified | John DOE |

| Validate | Private | Private | Users |
|---|---|---|---|
| ☐ | ☐ | Modified | John DOE |
| ☐ | ☐ | Modified | John DOE |
| ☐ | ☐ | Deleted | John DOE |
| ☐ | ☐ | Created | John DOE |
| ☐ | ☐ | Modified | John DOE |

DEVICE AND METHOD FOR FORMULATING A NUMERICAL MODEL OF A MANUFACTURED PRODUCT

CROSS REFERENCE TO RELATED APPLICATION

This application is related to French patent application No. 09.05606 filed Nov. 23, 2009, the contents of which are herein incorporated by reference.

FIELD

The present invention relates to a device and associated method for formulating numerical models of manufactured products. Each model includes numerical data representing components or functions of a manufactured product, of variables (especially different parameters for definition of a configuration of the manufactured product to be varied) and of constraints (prohibiting or on the other hand imposing certain combinations of components and/or of values assigned to variables and/or a methodology for selecting the components and/or the variables).

BACKGROUND

Conventional devices and methods for formulating numerical (information technology) models of manufactured products require advanced programming skills and their use is limited to specifically trained experts, such as information technology experts. Consequently, industrial companies that make use of such numerical modeling of manufactured products must rely on these trained experts to create, modify, and update the numerical models. Not all industrial companies possess such experts which results in difficulties in operation and employment for companies lacking these experts. In addition, the conventional devices and methods suit only certain categories of products and trades, and cannot be adapted to a wide array of products in varied fields of activity.

SUMMARY

To overcome the above deficiencies in the conventional art, a device and associated method is described herein for formulating numerical models of manufactured products that can be employed simply and intuitively by an operator who is not a specialist in information technology programming and that can be applied to a wide array of manufactured products, regardless of complexity. In one exemplary embodiment, a formulation device and method exhibits a quasi-universal character, corresponding to manufactured products and to categories of manufactured products in technical fields and trades.

More particularly, a device and associated method is described in which the definition of constraints is facilitated. In one exemplary embodiment, a device and associated method is described in which each step is executed one first time then executed again with modifications at any moment, with a minimum of constraints concerning the sequential order of execution of the formulation.

In one exemplary embodiment, a device and a method is described wherein a given numerical model is formulated progressively by several persons working on the numerical model successively or in parallel in collaboration to produce a functional numerical model. This functional model is testable and usable after each step of formulation of the numerical model. With a device and associated method according to the present invention, a given numerical model can be modified by several different persons, tested after each main formulation step and progressively improved after the very beginning of its use based on the needs expressed by the users.

In one exemplary embodiment, the device and associated method that is employed with any information technology resources, that is to say, in particular, that the device and associated method work across multiple platforms. The present invention, according to one exemplary embodiment, describes a device and associated method that is employed with a lightweight information technology device such as a commercial portable computer.

To accomplish this, the present invention relates to a device that includes a memory for storing numerical data, a processor for processing numerical data and at least one user interface. The device executes different steps successively to formulate a model, each step permitting a human operator of the device to define predetermined numerical data permitting constitution of the model and to store the predetermined numerical data in memory. The device executes at least one step, referred to as structure construction step, during which numerical data representative of a structure of a manufactured product defined by a tree structure linking the different structural components of the manufactured product are defined and stored in memory. The device also executes at least one step allowing constraints to be defined that are to be respected by every manufactured product in conformity with the model and at least one step allowing validation of a previously formulated model, during which all of the data stored in memory are subject to validation selections to validate their employment in execution of the model.

The device, at each step, displays at least one specific window of the user interface allowing an operator to acquire all of the data corresponding to this step. Also, for each step, each window provides execution, during and/or at the end of each step, of a functional model that defines a manufactured product configuration.

Furthermore, a device according to an exemplary embodiment of the present invention displays a window corresponding to each step that includes at least one launch button to start execution of the previously defined model when activated.

A device according to an exemplary embodiment of the present invention also displays a window of the user interface that both corresponds to the step of defining constraints and that receives at least one constraint from a user in at least one form belonging to the set formed by a macro, a formula and a matrix.

In addition, a device according to an exemplary embodiment of the present invention defines constraints applied to a product, whose obligatory character depends on the corresponding user profile.

A device according to an exemplary embodiment of the present invention further allows translations into at least one predetermined language of the set of different texts displayed on a user interface.

Furthermore, a device according to an exemplary embodiment of the present invention performs, after the first step of structure construction, a step of structure personalization, during which specific data representative of rules corresponding to at least one level of the structure are stored in memory. The device also performs at least one step of defining multi-media objects, linking these objects with data of the model stored in memory and incorporating these multi-media objects into a user interface. In addition, the device performs at least one step of defining access rights to at least part of the functionalities of the model according to a corresponding user profile and at least one step of defining rules applied in order to obtain and/or to compose commercial summary documents. The device further performs at least one step of defining rules for calculating prices, at least one step of defining personalized calculation methods, at least one step of defining logical events in a user interface, and at least one step of acquiring translations.

The present invention extends to a method for formulating numerical models of manufactured products, each model including numerical data representative of components of a manufactured product, of variables and constraints that are stored in memory by a device having a storing unit for storing numerical data. As can be appreciated, components can refer to any type of component, such as physical components and functional components. The device also includes a processor for processing numerical data and at least one user interface, and executes different steps to formulate a model by defining predetermined numerical data permitting constitution of the model and to store the data in memory.

The method includes at least one first step, referred to as structure construction step, during which numerical data representative of a structure of a manufactured product defined by a tree structure linking the different structural components of the manufactured product are defined and stored in memory. The method also includes at least one step of defining constraints that must be respected by every manufactured product in conformity with the model and at least one final step of validating a previously formulated model, during which all of the data stored in memory are presented and subjected to selections to validate their employment in execution of the model. The method further includes that, for each step, the device displays at least one specific window of the user interface that permits acquisition of all of the data corresponding to each step. Further, in each step, each window provides execution, during and/or at the end of each step, of a functional model used to define a manufactured product configuration.

Furthermore, a method according to the present invention provides that each window corresponding to each step includes at least one launch button that starts execution of the previously defined model when activated.

The method according to the present invention also provides that during the step of defining constraints, a window of the user interface is displayed that receives at least one constraint in at least one form belonging to the set formed by a macro, a formula and a matrix.

In addition, the method according to the present invention includes at least one step of defining constraints applied to a product, whose obligatory character depends on the corresponding user profile.

The method according to the present invention also includes a step of translating, into at least one predetermined language, the set of different data displayed in a user interface.

Furthermore, the method according to the present invention includes a step of structure personalization, after the first step of structure construction, during which specific data representative of rules corresponding to at least one level of the structure are stored in memory. The method also has at least one step of defining multi-media objects, linking these objects with data of the model stored in memory and incorporating these multi-media objects into the display of a user interface. The method also includes at least one step of defining rights of access to at least part of the functionalities of the model according to a corresponding user profile and at least one step of defining rules applied in order to obtain and/or to compose summary documents for commercial use. Further, the method includes at least one step of defining rules for calculating prices, at least one step of defining personalized calculation methods, at least one step of defining logical events in the display of a user interface and at least one step of acquiring translations.

Such a numerical model of a manufactured product may then be used with an electronic device to define numerical data representative of at least one definition of a configuration of a manufactured product as well as its structural technical and/or manufacturing and/or commercial (estimate, price, manufacturing lead time, etc.) and/or other characteristics.

It should be noted that the present invention does not generally consist solely of providing windows that allow for the execution of different formulation steps of the numerical model. To the contrary, the present invention also represents an implementation of information technology that provides specific steps and display windows such as mentioned above to permit its application in quasi universal manner to a wide variety of products, product categories, trades and areas of activity. In addition, because testing the functioning of the numerical model can be performed at each step, or in other words starting from each corresponding display window, each operator involved in the formulation of the numerical model, before validation of his own actions, can verify their proper functioning and their compatibility with the entirety of the already created numerical model.

The inventors have observed that the present invention achieves an unexpected compromise between, on the one hand, the precision and exhaustiveness necessary for defining components and variables (technical specifications, manufacturing process sheets, price or estimate calculations, allowance for technical or commercial constraints or for constraints relating to the customs of professionals and/or to the company, etc.) of extremely complex manufactured products (such as automobiles, personal and household goods, electronic devices or processing machines) and, on the other hand, the simplicity of use for a human operator, with simplification of the methodology to enable an operator to learn it easily and to perform the different steps in logical order. Thus, with the different steps mentioned above, a device and associated method according to the present invention provides the ability, in practice, to achieve numerical models for all kinds of manufactured products, in quasi-universal manner. In addition, the device and the method according to the present invention are compatible with collaborative and progressive use, since at least a partial functional model is obtained after each window corresponding to a step that has been closed and is therefore capable of being tested. In this way, the coherence of modifications introduced by any operator in any step can be tested prior to validation of the model.

It also should be noted that, although certain data treated by the numerical model or in a formulation device or method according to the present invention could have a certain cognitive significance for the final user, the data also presents a functional character in the sense that they directly influence the functioning of the numerical model or of the formulation device or method according to the present invention. In addition, in the stage of formulation of the numerical model, the data, variables and constraints are functional and have specific functional consideration in the formulation device and associated method. For example, data representative of structural components of the manufactured product are treated in the tree structure of the manufactured product and can influence the behavior of the numerical model as well as the formulation and functioning of the constraints corresponding to them.

The present invention also relates to a device and associated method characterized in combination by all or part of the characteristics mentioned above as will be described in detail below.

BRIEF DESCRIPTION OF THE DRAWINGS

Other characteristics, objectives and advantages of a method according to the present invention will become apparent upon reading the following description, which presents, by way of non-limitative example, an exemplary embodiment of the present invention with reference to the figures.

FIG. 3 is a schematic view of display windows corresponding to structure construction of a device according to an exemplary embodiment of the present invention;

FIG. 4 is another schematic view of display windows corresponding to structure construction of a device according to an exemplary embodiment of the present invention;

FIG. 6 is a schematic view of a display window corresponding to structure personalization of a device according to an exemplary embodiment of the present invention;

FIG. 8 is a schematic view of display windows corresponding to defining constraints of a device according to an exemplary embodiment of the present invention;

FIG. 10 is an additional schematic view of display windows corresponding to defining constraints of a device according to an exemplary embodiment of the present invention;

FIG. 12 is a schematic view of a display window corresponding to defining behaviors of constraints of a device according to an exemplary embodiment of the present invention;

FIG. 15 is a schematic view of a display window corresponding to defining rules for composing the summary documents according to an exemplary embodiment of the present invention;

FIG. 16 is a schematic view a display window corresponding to defining rules for calculation of prices according to an exemplary embodiment of the present invention;

FIG. 17 is a schematic view of a display window corresponding to defining personalized calculation methods according to an exemplary embodiment of the present invention;

FIG. 18 is a schematic view of a display window corresponding to defining logical events in the user interface according to an exemplary embodiment of the present invention;

FIG. 20 is a schematic view of a display window corresponding to validating a numerical model according to an exemplary embodiment of the present invention.

DETAILED DESCRIPTION

Figure 1:
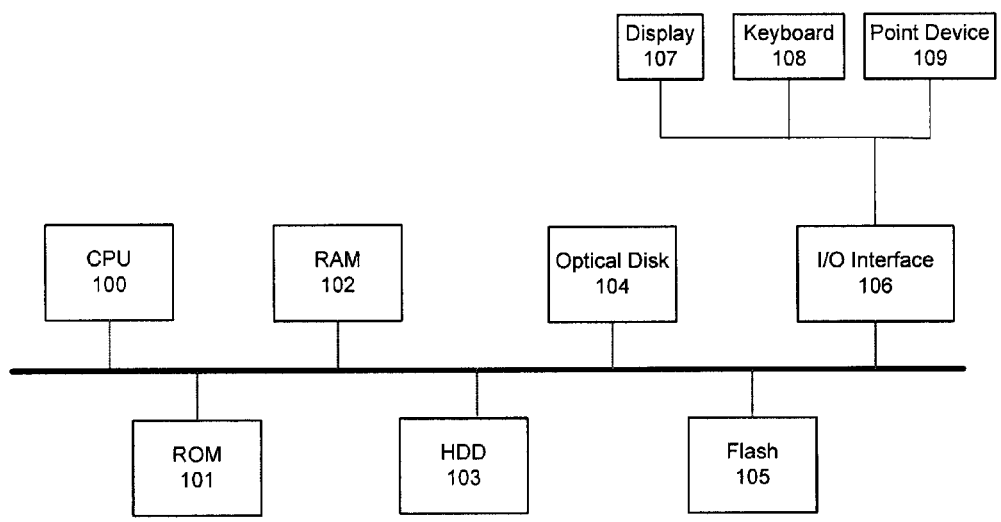
FIG. 1 is a schematic diagram of a device for formulating numerical models according to an exemplary embodiment of the present invention.

Referring now to the drawings, wherein like reference numerals designate identical or corresponding parts throughout the several views, the claimed present invention relates to a system and associated methodology for formulating a numerical model of a manufactured product. As can be appreciated, the term "manufactured product" can refer to any kind of product and/or service. FIG. 1 is a schematic diagram of a device for formulating numerical models according to an exemplary embodiment of the present invention. The device includes at least one information technology workstation, or computer, equipped with at least one user I/O interface 106, which permits on the one hand the acquisition of information items from a human operator via, for example, a keyboard 108 and pointing device 109, and on the other hand the presentation, via a display 107, of displays in the form of windows to a human operator. The device also includes information technology resources permitting processing of numerical data and recording thereof in read only memories, such as ROM 101, and/or random access memory (RAM) 102, and/or mass memories, such as a hard disk drive 13, and/or an optical disk 104 memory, such as Digital Video Disc (DVD), Compact Disc (CD) and Blu-ray™, and FLASH memory 105.

To form a device according to the present invention, the memories ROM 101, RAM 102 and/or mass memories of the information technology device are programmed with at least one software application that executes, via a processor 100, the different technical functionalities according to the method for formulating numerical models of manufactured products as described herein.

Figure 2:
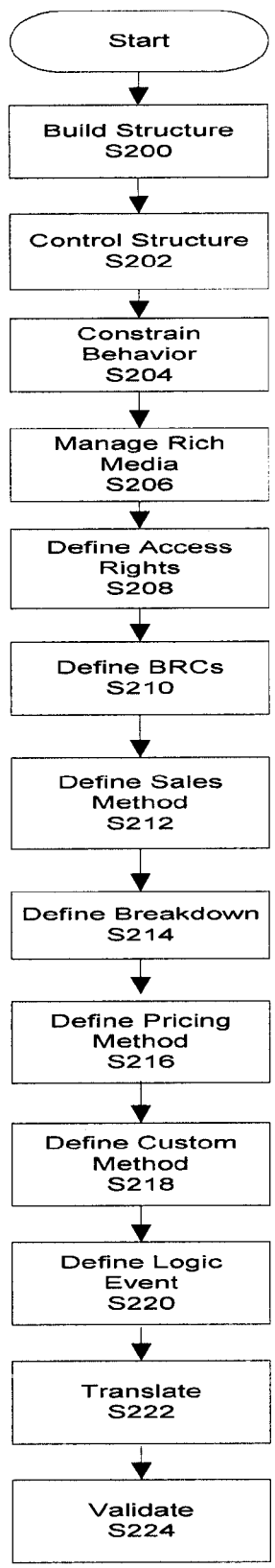
FIG. 2 is an algorithmic flowchart for formulating numerical models according to an exemplary embodiment of the present invention.

FIG. 2 is a flow chart of the overall processing to formulate a numerical model of a manufactured product. Each step of the flowchart is described below as it relates to the present invention. As can be appreciated, these steps can be performed in any order.

FIGS. 3-20 are the different display windows according to an exemplary embodiment of the present invention. Each of the different display windows executes one of the steps for formulation of a numerical model as described below with reference to FIG. 2. The windows are collected on a main composite window 20, provided with a top bar 21 of tabs that can be selected individually to execute each step, each tab corresponding to one step.

With reference to FIG. 3, bar 21 of main window 20 is provided with a generic tab 22 for defining and configuring the work space and with tabs corresponding respectively to the of steps of FIG. 2, which includes at least 12 steps. These 12 steps facilitate construction of any numerical model for any manufactured product, while taking into account all components, variables, and constraints that are encountered in practice and contemplated during the design of a manufactured product. Consequently, this embodiment of at least 12 steps is universal. As can be appreciated, not all of the 12 steps are necessary in certain contexts and/or for certain manufactured products and can be omitted and/or not used. As such, any of the 12 steps can be omitted, or additional steps can be added without departing from the scope of the present invention.

Main window 20 also has a bar 40 of preprogrammed tools (selectable buttons for executing preprogrammed functions, such as editing functions, move functions, selection, loading or recording, import or export functions, script verification functions, script execution functions, etc.) with a zone 41 dedicated to dynamic display (hyperlinks) of messages generated automatically by the device itself according to actions of the human operator (error messages, warning messages, information messages, etc.)

Main window 20 also has a window 42 dedicated to navigation within the structure of a manufactured product for which a numerical model is being formulated. This structure is defined by a tree structure 55 presented in navigation window 42 in particular linking different structural components of the manufactured product. Furthermore, tree structure 55 may include software components or components of services associated in the numerical model, with the structure of the manufactured product.

Advantageously, main window 20 also has a window 43 for filtering in the tree structure, in order to display only a certain part of the components, for example according to their type or their name or words in their description, etc.

Main window 20 also has a main work zone 44 in which one or more windows is or are displayed depending on the step in course of execution, or in other words depending on the selected tab and/or depending on the selected component of the tree structure.

A generic tab 22 for defining a work space for the operator (listing in particular the different drafts of numerical models in the course of formulation in the company and to which he has access, their different versions, different tasks in the course of execution, etc.) is visible permanently, or in other words is always present in main window 20, for example at the top left. However, as can be appreciated, the visibility of such a tab, and/or its location in no way limits the scope of the invention.

Each step of formulation of the numerical model is associated with at least one tab of main window 20, which therefore constitutes a display common to the different steps and accessible to the operator. The different tabs corresponding to the steps to be executed are ordered from left to right on tab bar 21 in the preferred chronological order to be used by the operator in working successively through the different steps of formulation of the numerical model. Nevertheless, it should be noted that the device according to the present invention provides for performance of any step of formulation at any time, or in other words in any order, as soon as a first step of construction of structure of a manufactured product has been achieved at least partly.

First tab 23 therefore corresponds to the first step of structure construction and corresponds to step S200 of FIG. 2. When this tab 23 is activated, toolbar 40 includes a zone 45 for defining new objects, thereby providing for the insertion new components of the manufactured product, in the form of a tree structure in the navigation window, in the manner of organization of a mass memory into folders, sub-folders and files in a computer operating system.

For each lower-level configurable product (or configurable subassembly), the first level of the tree structure is formed from folders each cataloging a family of variables associated with the product, for example: a folder cataloging structural components constituting the product; a folder cataloging accessories that can be incorporated into the product; a folder cataloging software programs that can be incorporated into the product or associated therewith (such as drivers if the product is a computer peripheral); a folder cataloging services that can be associated with the product (for example, extended warranty, maintenance, etc.). Other folders can be created depending on the product in question, the above list being given only by way of non-limitative example for the purposes of illustration.

The second level is formed of sub-folders, each defining a form cataloging a group of variables. Each form includes one or more sheets, each sheet providing for the treatment of parameters or properties for a variable present in the form.

In tree structure 55 of the structure of a manufactured product in navigation window 42, each level can be activated, thus modifying the contents of work zone 44.

Zone 45 for defining new objects having buttons 46, 47, 48 for inserting new components of the manufactured product into the tree structure in the navigation window.

First button 46 adds a node, or in other words a new folder, into the tree structure. Second button 47 adds a form into the tree structure. Third button 48 adds a new question into a form of the tree structure.

Furthermore, toolbar 40 includes a zone 49 for recording or loading a numerical model for formulation; an editing zone 50 for copying, cutting, pasting, moving, deleting, linking, etc. components in tree structure 55 and/or objects in work zone 44; and a zone 52 for performing tests, launching the functional model in its as-is state via a launch button 56, or executing other tasks from the numerical model for formulation.

In the state of FIG. 3 and corresponding step S200 of FIG. 2, a first folder corresponding to construction of components of the structure of a manufactured product is activated in tree structure 55, and work zone 44 includes a window 53 for defining the properties of the folder in this numerical model, or in other words for defining a work space, a logical folder name, the apparent name of the folder in progress and validity dates of the folder in the numerical model.

FIG. 4, corresponding to step S200 of FIG. 2, is the state of work zone 44 when button 47 for defining a new form is activated or else when an element of form type is selected in zone 55 from among the elements defining the tree structure of the generic features of the new manufactured product. Window 61 accepts definition of the general system properties of this element.

Figure 5C:
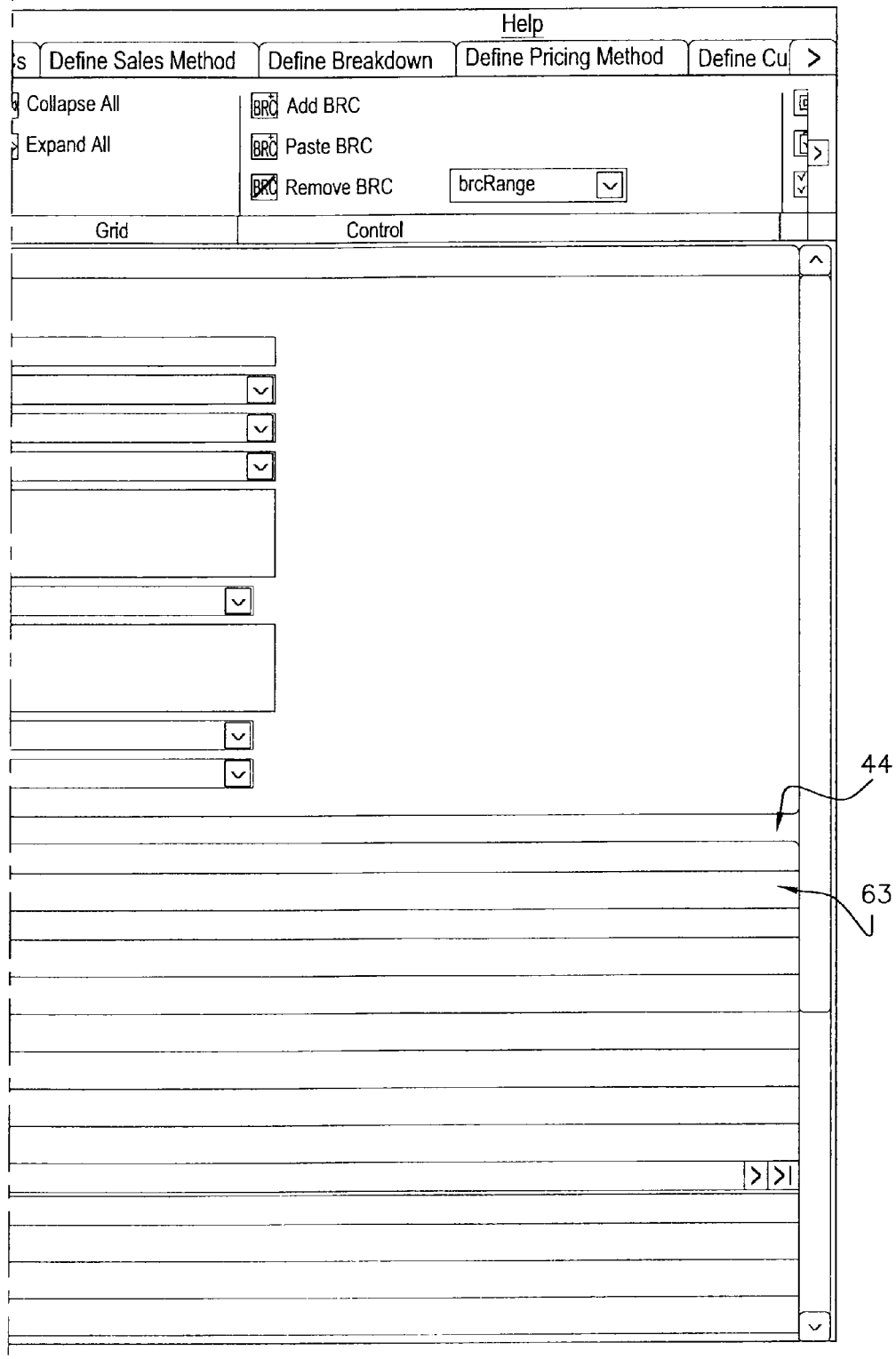
FIG. 5 is an additional schematic view of display windows corresponding to structure construction of a device according to an exemplary embodiment of the present invention.

FIG. 5, corresponding to step S200 of FIG. 2, is the state of work zone 44 when button 48 for defining a new question of the form is activated or else when an element of form question type is selected in zone 55 from among the elements defining the tree structure of the generic features of the new manufactured product. Window 63 accepts definition of parameters of functions or of constraints for each question (sheet) of the form to be created, providing for personalization of its content and/or behavior.

FIG. 6, corresponding to step S202 of FIG. 2, is the state of main window 20 when tab 24 for personalization of the structure is activated, corresponding to a step during which the personalization of the previously defined structure for the manufactured product is achieved. Work zone 44 then includes a window 81 for presenting a form for personalizing the behavior and execution rules of each level of the structure, or in other words for the folders, the forms and the sheets.

Figure 7A:
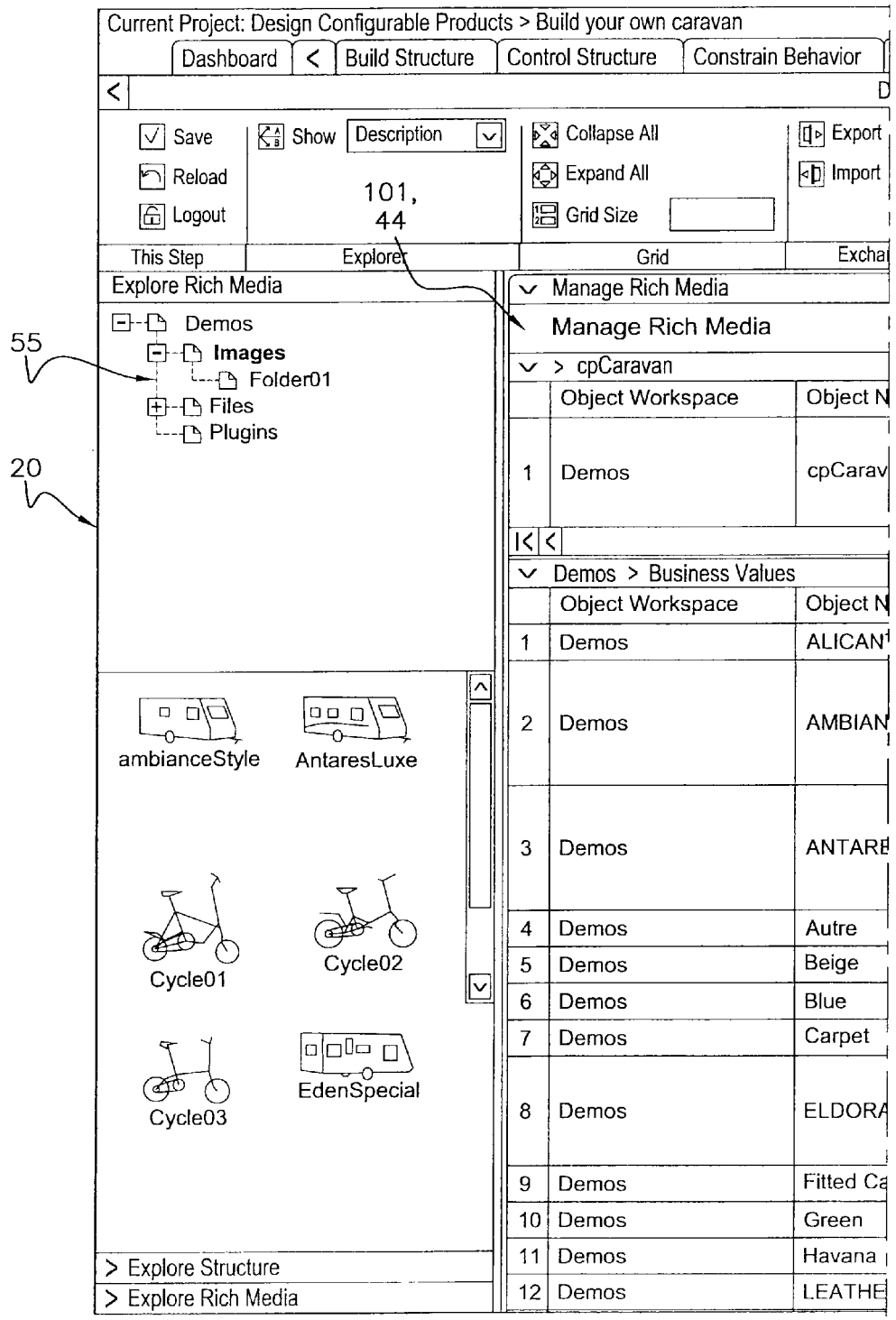
FIG. 7 is a schematic view of a display window corresponding to defining multi-media objects of a device according to an exemplary embodiment of the present invention.

FIG. 7, corresponding to step S206 of FIG. 2, is the state of main window 20 when tab 26 for incorporating multi-media objects is activated. In this step, multi-media objects to be incorporated in the numerical model are defined. To do so, work zone 44 has a window 101, in which a table can be presented for each level of tree structure 55 in order to define the multi-media objects associated with that level, for example an image, a video, a URL address, a file name, a text description, a miniature image, or other objects.

FIG. 8, corresponding to step S210 of FIG. 2, is the state of main window 20 when tab 34 for defining constraints is activated and when a sub-tab 121 for defining parameters of a new constraint is also activated. In this step, work zone 44 includes a window 110 for defining a name and a description for the constraint, as well as its type (definition in the form of a matrix, of a formula, of a macro, etc.), and a window 111 for defining the different elements to which the constraint must apply, these different elements being defined by their name (alias).

Figure 9A:
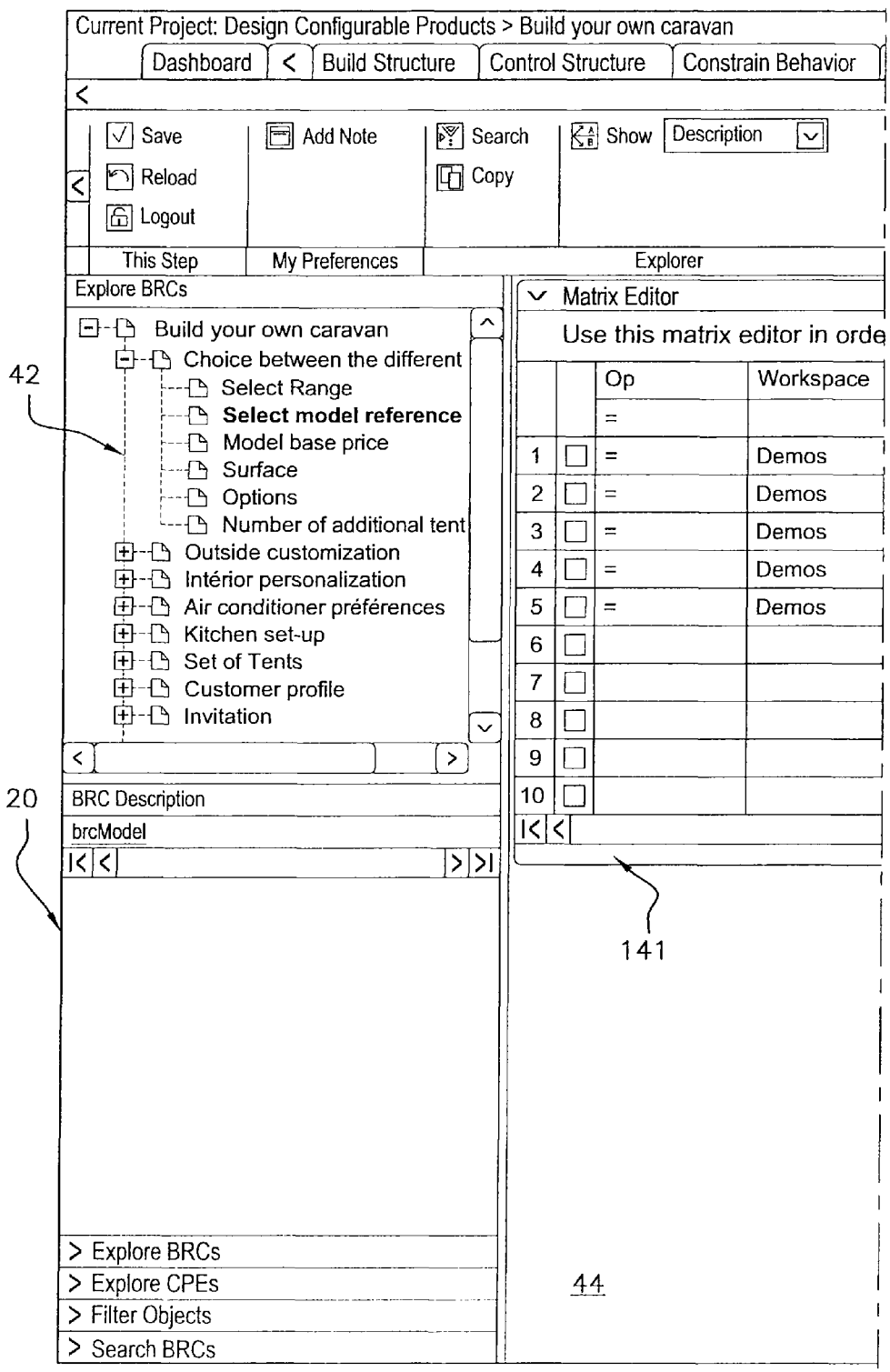
FIG. 9 is another schematic view of display windows corresponding to defining constraints of a device according to an exemplary embodiment of the present invention.
Figure 9B:
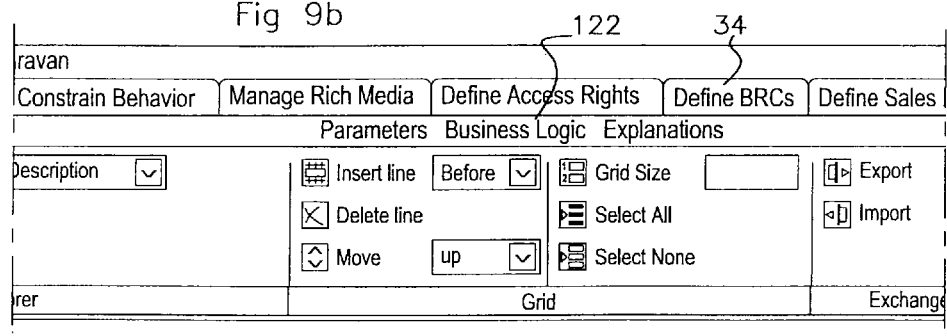

FIG. 9, corresponding to step S210 of FIG. 2, is the state of main window 20 when tab 34 for defining constraints is activated, as is also a sub-tab 122 for defining logical rules, for a constraint selected in the tree structure of navigation window 42. In this step, constraints can be defined by virtue of a matrix editor displayed in a window 141 in work zone 44. This matrix editor window 141 opens automatically according to the type of constraint defined during creation of this preceding last step. In fact, depending on the type of constraint created, the activation of sub-tab 122 and the selection of the constraint in navigation window 42 causes automatic opening of the editor appropriate to the type of constraint to be defined.

FIG. 10, corresponding to step S210 of FIG. 2, is the state of main window 20 when tab 34 for defining constraints is activated, as well as sub-tab 122, and for a constraint of formula type. The constraint may then be defined by virtue of a formula editor displayed in a window 142 in work zone 44.

Figure 11A:
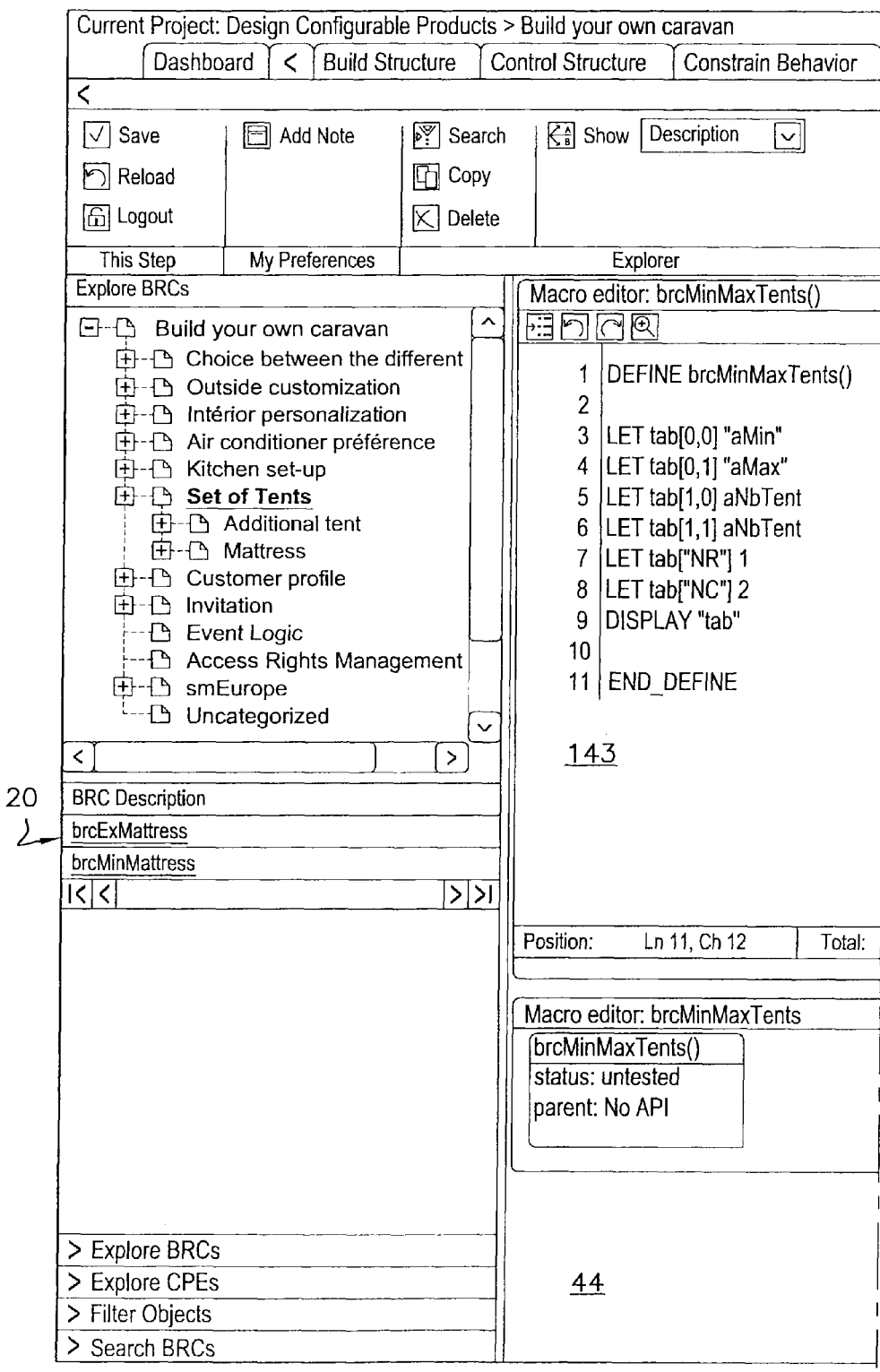
FIG. 11 is another schematic view of display windows corresponding to defining constraints of a device according to an exemplary embodiment of the present invention.

FIG. 11, corresponding to step S210 of FIG. 2, is the state of main window 20 in the case of a constraint of macro type, defined by virtue of a macro editor displayed in a window 143 in work zone 44.

FIG. 12, corresponding to step S204 of FIG. 2, is the state of main window 20 when tab 25 for defining the behavior of constraints is activated. Window 91 in work zone 44 and the sub-windows that it contains provide for the addition of a constraint for each element of tree structure 55 and to define the manner in which it is treated, and to which structural element(s) it must be applied.

Figure 13A:
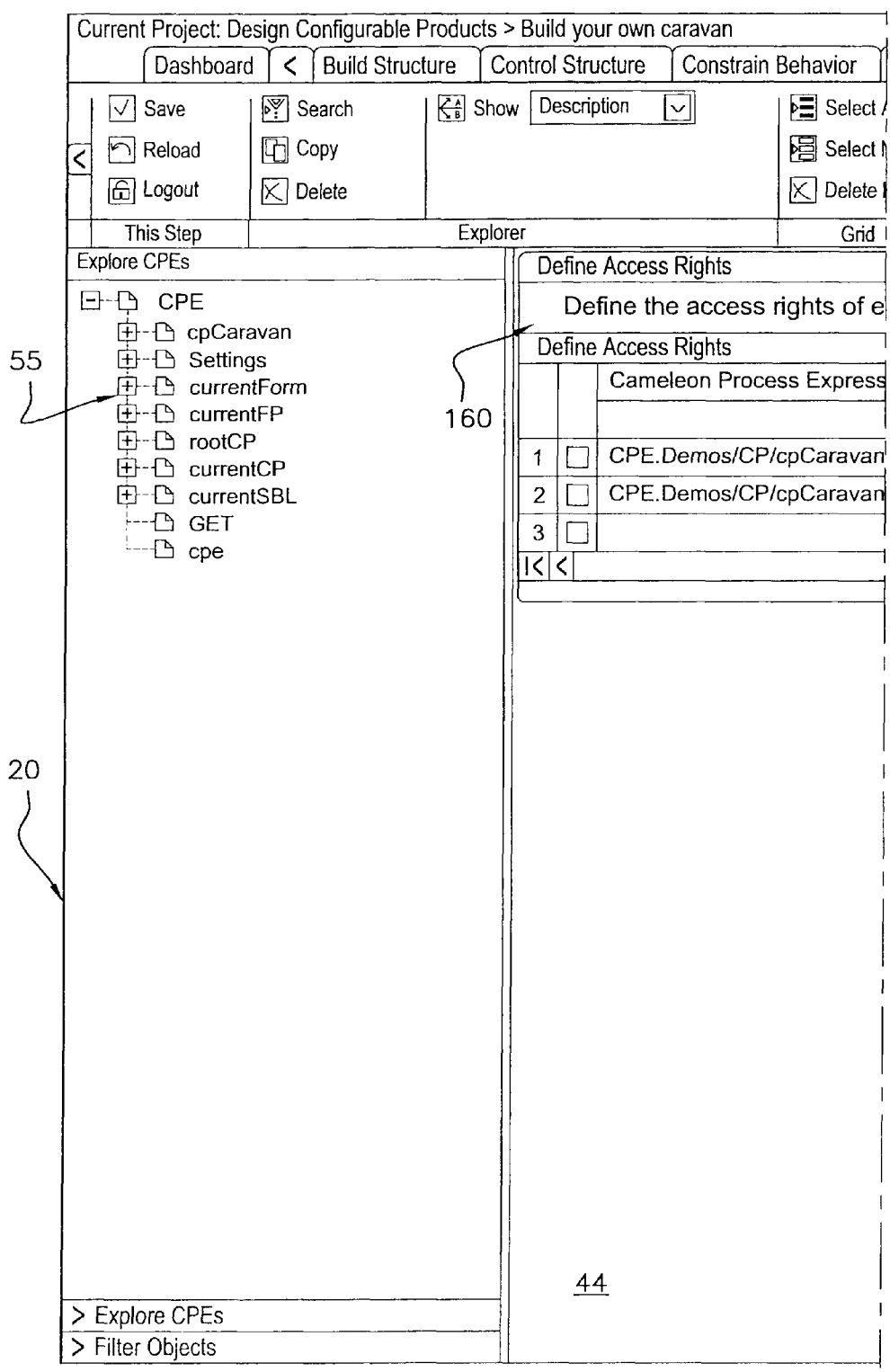
FIG. 13 is a schematic view of a display window corresponding to defining access rights of a device according to an exemplary embodiment of the present invention.

FIG. 13, corresponding to step S208 of FIG. 2, is the state of main window 20 when tab 27 for defining access rights is activated. In this step, window 160 in work zone 44 accepts definition of rights of access to the different elements of the structure defined in tree structure 55 and to the different constraints and/or to their behavior parameters, according to different profiles of users of the numerical model. These different user profiles can be defined in a separate step, or else during this same step. For example, an information technology user may consider providing certain elements of the numerical model with modification capabilities, whereas a user who utilizes the numerical model only to formulate commercial documents corresponding to the different previously modeled manufactured products should have limited possibilities to intervene in the numerical model (for example, exclusively the choice of specific options or price schedules).

Figure 14A:
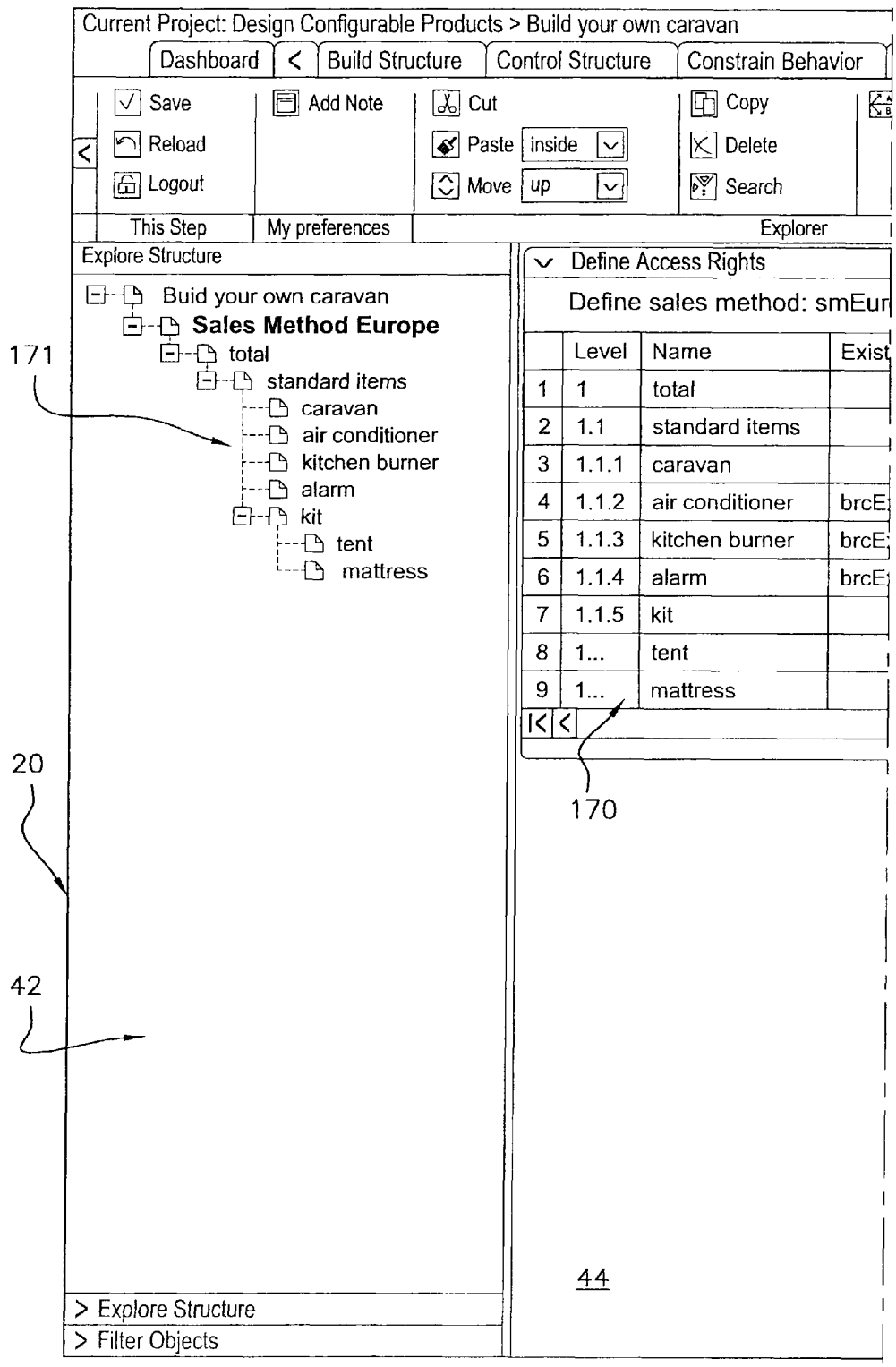
FIG. 14 is a schematic view of a display window corresponding to defining rules applied in order to obtain summary documents for commercial use according to an exemplary embodiment of the present invention.
Figure 14C:
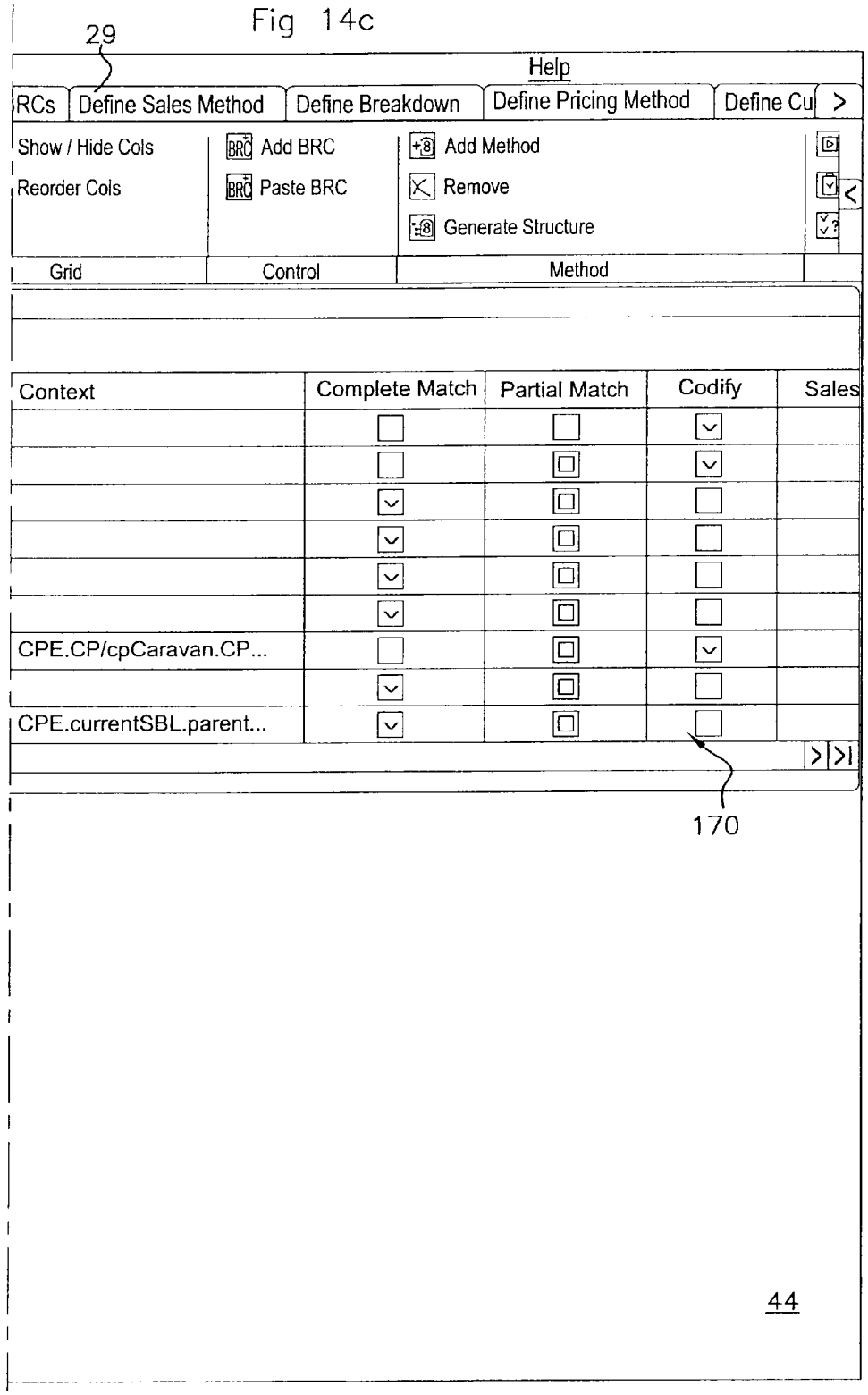

FIG. 14, corresponding to step S212 of FIG. 2, is the state of main window 20 when tab 29, referred to as the tab for defining sales methods, is activated. Tab 29 provides for the generation of rules applied in order to obtain summary documents for commercial use. In this step, navigation window 42 no longer contains tree structure 55 of the structure of the manufactured product as defined in the numerical model, but a tree structure 171 for defining the product in a manner adapted to its technical and commercial presentation. Window 170 activated in work zone 44 accepts definition of rules applied in order to obtain the desired final presentation and/or other elements, such as technical sheets or sales information documents generated by other devices, databases or software applications linked to the device according to the present invention.

FIG. 15, corresponding to step S214 of FIG. 2, is the state of main window 20 when a tab 30 for defining rules for composing the summary documents is activated. In this step, work zone 44 has one or more windows 180 for defining, for each element of presentation tree structure 171, structural components of tree structure 55 of the manufactured product and/or constraints and/or price schedule elements and/or links to references of constituent components of the product.

FIG. 16, corresponding to step S216 of FIG. 2, is the state of main window 20 when tab 31 for defining price calculation rules is activated. In this step, at least one window 190 of work zone 44 accepts definition of different parameters, methods and/or rules and/or calculation formulas, variables and/or constraints, to allow the prices of different constituent elements of presentation tree structure 171, as well as the total price to be obtained.

FIG. 17, corresponding to step S218 of FIG. 2, is the state of main window 20 when tab 32 for defining personalized calculation methods is activated. In this step, at least one window 200 in work zone 44 accepts definition of different parameters, methods and/or rules and/or calculation formulas, variables and/or constraints applicable for execution of calculation methods defined by the operator in order to personalize the numerical model and to adapt it to the needs of potential different users and to their trade.

FIG. 18, corresponding to step S220 of FIG. 2, is the state of main window 20 when tab 33 for defining logical events is activated. In this step, work zone 44 has at least one window 211 for defining logical events, or in other words animations, automatic operations and successions of display windows and/or software modules, intended to be executed in one or more windows of the user interface of the numerical model.

Figure 19C:
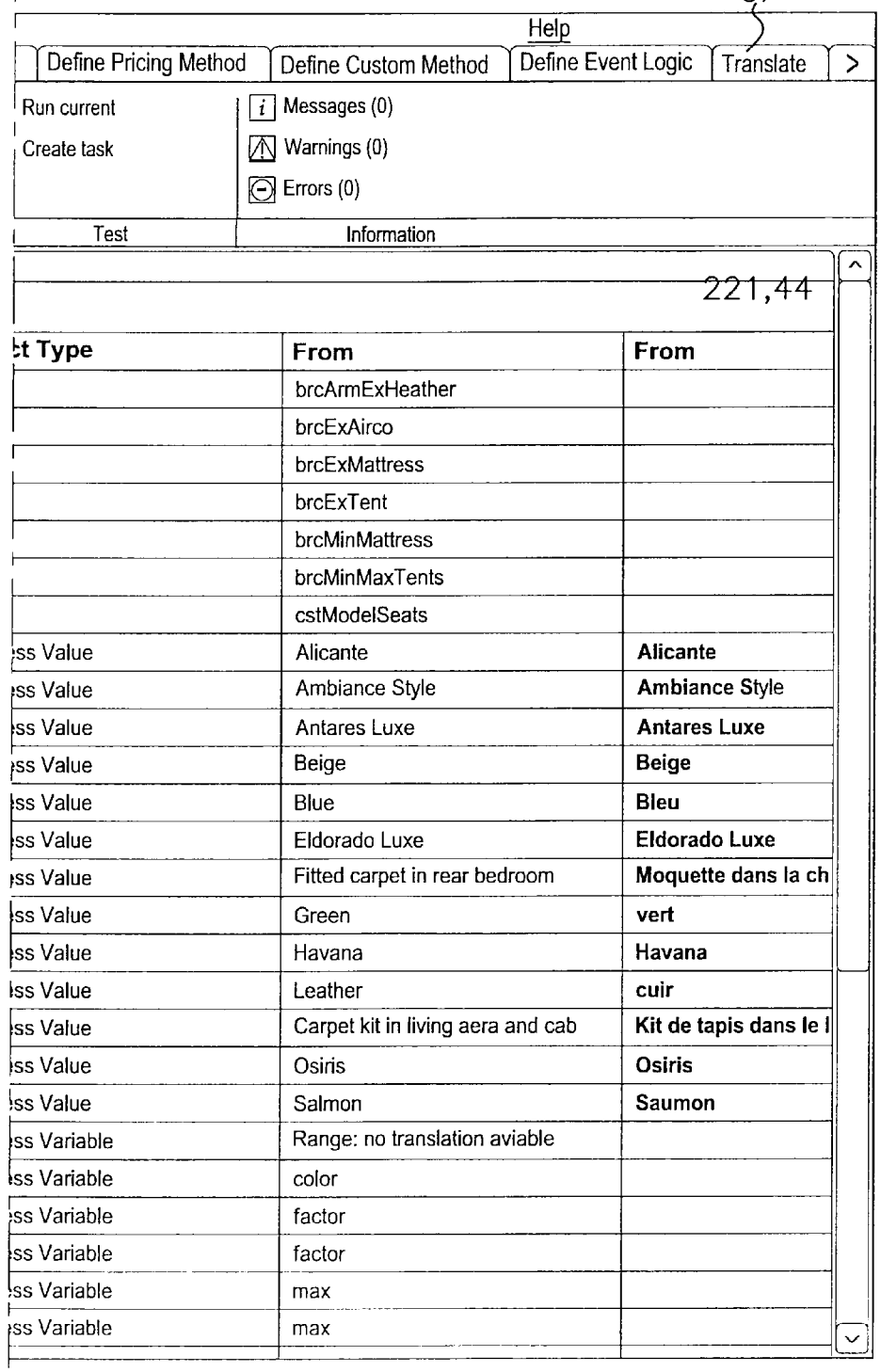
FIG. 19 is a schematic view of a display window corresponding to acquiring translations according to an exemplary embodiment of the present invention.

FIG. 19, corresponding to step S222 of FIG. 2, is the state of main window 20 when tab 37 for acquiring translations is activated. In this step, work zone 44 has at least one window 221 for defining (by acquisition or importation) texts of translations into different languages for each element of structural tree structure 55 of the manufactured product.

FIG. 20, corresponding to step S224 of FIG. 2, is the state of main window 20 when tab 38 for validating a previously formulated numerical model is activated. In this step, at least one window 231 is presented in work zone 44, having sub-windows for each object modified previously by the operator in the numerical model and allowing him to validate or not to validate the modification made. In this way, if the operator is uncertain of the pertinence of his modification, or if he wishes to work again on the same object at a later time before validating the modification in a new version of the numerical model, he can refrain from validating the last modification that he made.

It should be noted that all the display windows corresponding to the different steps executed before the final validation step present the operator with test zone 52 having a button 56 for launching the numerical model in the as-is state. Thus, in each step, the operator may test the functioning of the numerical model in its functional state as of that moment and may therefore verify the good compatibility of the different modifications and acquisitions that he himself has previously made. In particular, an at least partial functional numerical model is obtained upon closing of each of the windows corresponding to each of the tabs. Stated otherwise, after this numerical model has been recorded, a user may launch the numerical model from launch button 56 in order to test the functionalities of the numerical model with a view to obtaining a personalized configuration of a manufactured product, even in the absence of final validation of the numerical model by validation tab 38.

The different technical functions mentioned above can be obtained by employing information technology means in particular and/or software programming means. A formulation method according to the present invention can be implemented by virtue of a recording medium in which the instructions for the numerical data processing means, such as the processor 100, are stored in memory, this recording medium being readable by an information technology device and being executable in order to load the formulation method according to the present invention into random-access memory and to execute it. Such a recording medium therefore provides for modification, via execution of the instructions that it contains, of an information technology device in order to transform it into a formulation device according to the present invention.

Any processes, descriptions or blocks in flowcharts described herein should be understood as representing modules, segments, or portions of code which include one or more executable instructions for implementing specific logical functions or steps in the process, and alternate implementations are included within the scope of the exemplary embodiment of the present advancements in which functions can be executed out of order from that shown or discussed, including substantially concurrently or in reverse order depending upon the functionality involved.

Obviously, numerous modifications and variations of the present advancements are possible in light of the above teachings. It is therefore to be understood that within the scope of the appended claims, the present advancements can be practiced otherwise than as specifically described herein.

The invention claimed is:

1. A device for formulating numerical models of manufactured products by defining predetermined numerical data, comprising:
   a display unit;
   a storage unit configured to store numerical data for each model, the numerical data being representative of components constitutive of a manufactured product, variables and constraints;
   a processor configured to formulate a numerical model, the processor including
      a structure construction unit configured to generate and store in the storage unit numerical data corresponding to a structure of the manufactured product, the structure being a tree structure linking different structural components of the manufactured product,
      a constraint unit configured to define constraints for conformance with the numerical model, and
      a validation unit configured to display, on the display unit,
         the numerical data stored in the storage unit, and
         a plurality of validation selections to validate inclusion of the displayed numerical data of a previously formulated numerical model when executing the numerical model,
   wherein
      the display unit displays different specific acquisition windows of the user interface defining different formulation steps to formulate the numerical model,
      each specific acquisition window being configured to acquire all numerical data needed for one corresponding formulation step,
      each specific acquisition window and corresponding formulation step permitting a human operator of the device to define predetermined numerical data permitting constitution of the numerical model and to store the predetermined numerical data in memory,
   wherein said acquisition windows and corresponding formulation steps comprise:
      at least one structure construction acquisition window and structure construction formulation step, during which numerical data representative of a structure of a manufactured product defined by a tree structure linking the different structural components of said manufactured product are defined and stored in memory,
      at least one constraints acquisition window and constraints formulation step allowing constraints to be defined that are to be respected by every manufactured product in conformity with the numerical model,
      and at least one validation acquisition window and validation formulation step allowing validation of a previously formulated model, during which all of the data stored in memory are subject to validation selections to validate their employment in execution of the model,
   and wherein each acquisition window and said corresponding formulation step are further configured to execute a functional model that can be used to define a manufactured product configuration.

2. The device according to claim 1, wherein the display unit further displays a launch window corresponding to each formulation step and including at least one launch button configured to start execution of the previously formulated numerical model when activated.

3. The device according to claim 1, wherein the constraints acquisition window and the constraints formulation step are configured to receive definition of at least one constraint, the constraint being at least one of a macro, a formula and a matrix.

4. The device according to claim 1, wherein said acquisition windows and corresponding formulation steps further include a constraints definition acquisition window and a constraints definition formulation step configured to define constraints to be applied to a product based on a corresponding user profile.

5. The device according to claim 1, wherein said acquisition windows and corresponding formulation steps further include a translation acquisition window and a translation formulation step configured to translate a set of different texts displayed via the display interface into at least one predetermined language.

6. The device according to claim 1, wherein said acquisition windows and corresponding formulation steps further include
   a structure personalization acquisition window and a structure personalization formulation step configured to store rules data corresponding to at least one level of the generated structure,
   a multi-media acquisition window and a multi-media formulation step configured to define multi-media objects, link the multi-media objects with numerical data stored in the storage unit, and incorporate, on the display unit, the multi-media objects, a constraints definition acquisition window and a constraints definition formulation step configured to define access rights to at least some functionalities of the numerical model according to a corresponding user profile, a summarization acquisition window and a summarization acquisition formulation step configured to define rules to generate commercial summary documents, a pricing acquisition window and a pricing formulation step configured to define rules to calculate prices, a customizing acquisition window and a customizing formulation step configured to define personalized calculation methods, an event acquisition window and an event formulation step configured to define, on the display unit, logical events, a translation acquisition window and a translation formulation step configured to acquire translations.

7. A method for formulating numerical models of manufactured products by defining predetermined numerical data, comprising:

storing numerical data for each model, the numerical data being representative of components of a manufactured product, variables and constraints;

formulating a numerical model, in a processor, the formulating including generating numerical data corresponding to a structure of the manufactured product, the structure being a tree structure linking different structural components of the manufactured product, storing the generated numerical data, defining constraints for conformance with the numerical model, displaying, on a display unit, the numerical data stored in the storage unit, and displaying, on the display unit a plurality of validation selections configured to validate inclusion of the displayed numerical data of a previously formulated numerical model when executing the numerical model, displaying, on the display unit, different specific acquisition windows of the user interface defining different formulation steps to formulate the numerical model, each specific acquisition window being configured to acquire all numerical data needed for one corresponding formulation step, each specific acquisition window and corresponding formulation step permitting a human operator of the device to define predetermined numerical data permitting constitution of the numerical model and to store the predetermined numerical data in memory, said acquisition windows and corresponding formulation steps comprising:

at least one structure construction acquisition window and structure construction formulation step, during which numerical data representative of a structure of a manufactured product defined by a tree structure linking the different structural components of said manufactured product are defined and stored in memory, at least one constraints acquisition window and constraints formulation step allowing constraints to be defined that are to be respected by every manufactured product in conformity with the numerical model, and at least one validation acquisition window and validation formulation step allowing validation of a previously formulated model, during which all of the data stored in memory are subject to validation selections to validate their employment in execution of the model, each acquisition window and said corresponding formulation step being further configured to execute a functional model that can be used to define a manufactured product configuration.

8. The method according to claim 7, further including displaying, on the display unit, a launch window corresponding to each acquisition window and corresponding formulation step and including at least one launch button configured to start execution of the previously defined model when activated.

9. The method according to claim 7, wherein the constraints acquisition window and the constraints formulation step are configured to receive definition of at least one constraint, the constraint being at least one of a macro, a formula and a matrix.

10. The method according to claim 7, wherein said acquisition windows and corresponding formulation steps further include a constraints definition acquisition window and a constraints definition formulation step defining constraints to be applied to a product based on a corresponding user profile.

11. The method according to claim 7, wherein said acquisition windows and corresponding formulation steps further include translating a set of different data displayed via the display interface into at least one predetermined language.

12. The method according to claim 7, wherein said acquisition windows and corresponding formulation steps further include a structure personalization acquisition window and a structure personalization formulation step for personalizing the structure by storing rules data corresponding to at least one level of the generated structure, defining multimedia objects, a multi-media acquisition window and a multi-media formulation step for linking the multi-media objects with numerical data stored in memory, incorporating the multi-media objects into the display interface, a constraints definition acquisition window and a constraints definition formulation step for defining rights of access to at least some functionalities of the numerical model according to a corresponding user profile, a summarization acquisition window and a summarization acquisition formulation step for defining rules to generate commercial summary documents, a pricing acquisition window and a pricing formulation step for defining rules to calculate prices, a customizing acquisition window and a customizing formulation step for defining personalized calculation methods, an event acquisition window and an event formulation step for defining logical events on the display interface, and a translation acquisition window and a translation formulation step for acquiring translations.

13. The method according to claim 7, wherein each acquisition window and corresponding formulation step is associated with one tab of a main common window accessible to the operator.

14. The method according to claim 7, wherein a navigation window is displayed dedicated to navigation within the structure of the manufactured product as defined by the structure construction acquisition window and the structure construction formulation step.

15. A non-transitory computer-readable medium storing computer readable instructions thereon that when executed by a device for formulating numerical models of manufactured products by defining predetermined numerical data cause the device to perform the method, comprising:

storing numerical data for each model, the numerical data being representative of components of a manufactured product, variables and constraints;

formulating a numerical model, in a processor, the formulating including generating numerical data corresponding to a structure of the manufactured product, the structure being a tree structure linking different structural components of the manufactured product, storing the generated numerical data, defining constraints for conformance with the numerical model, displaying, on a display unit, the numerical data stored in the storage unit, and displaying, on the display unit a plurality of validation selections configured to validate inclusion of the displayed numerical data of a previously formulated numerical model when executing the numerical model, displaying, on the display unit, different specific acquisition windows of the user interface defining different formulation steps to formulate the numerical model, each specific acquisition window being configured to acquire all numerical data needed for one corresponding formulation step, each specific acquisition window and corresponding formulation step permitting a human operator of the device to define predetermined numerical data permitting constitution of the numerical model and to store the predetermined numerical data in memory, said acquisition windows and corresponding formulation steps comprising:

at least one structure construction acquisition window and structure construction formulation step, during which numerical data representative of a structure of a manufactured product defined by a tree structure linking the different structural components of said manufactured product are defined and stored in memory, at least one constraints acquisition window and constraints formulation step allowing constraints to be defined that are to be respected by every manufactured product in conformity with the numerical model, and at least one validation acquisition window and validation formulation step allowing validation of a previously formulated model, during which all of the data stored in memory are subject to validation selections to validate their employment in execution of the model, each acquisition window and said corresponding formulation step being further configured to execute a functional model that can be used to define a manufactured product configuration.

16. The non-transitory computer-readable medium according to claim 15, further including displaying a launch window corresponding to each acquisition window and corresponding formulating step and including at least one launch button configured to start execution of the previously defined model when activated.

17. The non-transitory computer-readable medium according to claim 15, wherein the constraints acquisition window and the constraints formulation step are configured to receive definition of at least one constraint, the constraint being at least one of a macro, a formula and a matrix.

18. The non-transitory computer-readable medium according to claim 15, wherein said acquisition windows and corresponding formulation steps further include a constraints definition acquisition window and a constraints definition formulation step defining constraints to be applied to a product based on a corresponding user profile.

19. The non-transitory computer-readable medium according to claim 15, wherein said acquisition windows and corresponding formulation steps further include translating a set of different data displayed via the display interface into at least one predetermined language.

20. The non-transitory computer-readable medium according to claim 15, wherein said acquisition windows and corresponding formulation steps further include a structure personalization acquisition window and a structure personalization formulation step for personalizing the structure by storing rules data corresponding to at least one level of the generated structure, defining multi-media objects, a multi-media acquisition window and a multi-media formulation step for linking multi-media objects with numerical data stored in memory, incorporating the multi-media objects into the display interface, a constraints definition acquisition window and a constraints definition formulation step for defining rights of access to at least some functionalities of the numerical model according to a corresponding user profile, a summarization acquisition window and a summarization acquisition formulation step for defining rules to generate commercial summary documents, a pricing acquisition window and a pricing formulation step for defining rules to calculate prices, a customizing acquisition window and a customizing formulation step for defining personalized calculation methods, an event acquisition window and an event formulation step for defining logical events on the display interface, and a translation acquisition window and a translation formulation step for acquiring translations.

* * * * *